United States Patent
Han et al.

(10) Patent No.: US 7,697,622 B2
(45) Date of Patent: Apr. 13, 2010

(54) APPARATUS AND METHOD FOR TRANSMITTING/RECEIVING DATA IN A MULTI-ANTENNA COMMUNICATION SYSTEM

(75) Inventors: Jin-Kyu Han, Seoul (KR); Farooq Khan, Allen, TX (US); Hwan-Joon Kwon, Hwaseong-si (KR); Ju-Ho Lee, Suwon-si (KR); Cornelius Van Rensburg, Dallas, TX (US); Dong-Hee Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 741 days.

(21) Appl. No.: 11/589,985

(22) Filed: Oct. 31, 2006

(65) Prior Publication Data

US 2007/0104283 A1    May 10, 2007

(30) Foreign Application Priority Data

Oct. 31, 2005    (KR)    ............... 10-2005-0103554

(51) Int. Cl.
     *H04L 27/00*    (2006.01)
(52) U.S. Cl. ..................... 375/260; 375/299
(58) Field of Classification Search ......... 375/260, 375/295, 316; 370/203–210
     See application file for complete search history.

(56) References Cited

U.S. PATENT DOCUMENTS

| 6,785,431 B2 | 8/2004 | Pan et al. |
| 7,302,009 B2 * | 11/2007 | Walton et al. ............... 375/267 |
| 2003/0235147 A1 | 12/2003 | Walton et al. |
| 2004/0082356 A1 | 4/2004 | Walton et al. |
| 2004/0235147 A1 | 11/2004 | Chappell |
| 2008/0186943 A1 * | 8/2008 | Wiatrowski et al. ......... 370/347 |
| 2008/0285686 A1 * | 11/2008 | Beaulieu et al. ............. 375/329 |

FOREIGN PATENT DOCUMENTS

| RU | 2238611 | 2/2004 |
| WO | WO 2003/085875 | 10/2003 |

* cited by examiner

*Primary Examiner*—Emmanuel Bayard
(74) *Attorney, Agent, or Firm*—Roylance, Abrams, Berdo & Goodman, L.L.P.

(57) ABSTRACT

An apparatus for transmitting data in a base station of a wireless communication system that transmits data depending on channel status information fed back from terminals and uses a plurality of antennas. Based on the channel status information, a scheduler determines a terminal to which the base station will transmit data, determines antennas via which the base station will transmit data among the plurality of antennas, and determines a space pre-coding method. A multiplexer multiplexes transmission data into a plurality of data streams according to the number of the determined antennas. A modulation and coding unit performs modulation and coding on each of the data streams. A pre-coding controller outputs a matrix select signal for selecting one of a plurality of space pre-coding matrixes according to the space pre-coding method. A space pre-coder spatial-codes each of the coded streams with the matrix selected based on the matrix select signal. An OFDM modulator performs OFDM modulation on each of the spatial-coded streams. An RF unit transmits each of the OFDM-modulated streams via an associated antenna.

24 Claims, 15 Drawing Sheets

APPARATUS AND METHOD FOR TRANSMITTING/RECEIVING DATA IN A MULTI-ANTENNA COMMUNICATION SYSTEM

PRIORITY

This application claims the benefit under 35 U.S.C. § 119 (a) of an application entitled "Apparatus and Method for Transmitting/Receiving Data in a Multi-Antenna Communication System" filed in the Korean Intellectual Property Office on Oct. 31, 2005 and assigned Serial No. 2005-103554, the entire contents of which are hereby incorporated by reference.

BACKGROUND OF THE INVENTION

1. Field of the Invention

The present invention relates generally to an apparatus and method for transmitting/receiving data in a communication system using multiple antennas (hereinafter referred to as a "multi-antenna communication system"), and in particular, to an apparatus and method for spatial multiplexing transmission in a multi-antenna communication system.

2. Description of the Related Art

A wireless communication system has been developed to allow users to perform communication without distance limitations. A mobile communication system is the typical wireless communication system. The mobile communication system has evolved from the early voice service communication system into a high-speed, high-quality wireless packet data communication system for providing data service and multimedia service. It can be considered that the ongoing standardization on High Speed Downlink Packet Access (HSDPA) led by $3^{rd}$ Generation Partnership Project (3GPP), and Evolution for Data and Voice (EV-DV) and Evolution-Data Only (EV-DO) led by $3^{rd}$ Generation Partnership Project 2 (3GPP2) is a typical attempt to find a solution for the high-speed, high quality wireless packet data transmission service at 2 Mbps or higher in the $3^{rd}$ generation (3G) mobile communication system.

Meanwhile, research on the $4^{th}$ generation (4G) mobile communication system is being conducted with the aim of providing higher-speed, higher-quality multimedia service using Orthogonal Frequency Division Multiplexing (OFDM) and Orthogonal Frequency Division Multiple Access (OFDMA).

The current 3G wireless packet data communication systems, like the HSDPA, EV-DV and EV-DO, use an Adaptive Modulation and Coding (AMC) method and a channel sensitive scheduling resource management method to improve transmission efficiency. With the use of the AMC method, a transmitter can adjust the amount of transmission data according to channel status. That is, the transmitter decreases the amount of transmission data in a channel having bad status and increases the amount of transmission data in a channel having good status, thereby efficiently transmitting the large amount of data while maintaining a desired reception error probability.

With the channel sensitive scheduling resource management method, a transmitter selects a good-channel status user, thereby increasing the data throughput. In the AMC method and the channel sensitive scheduling resource management method, the transmitter receives partial channel status information fed back from a receiver, and applies an appropriate modulation and coding technique determined at the time to be most efficient.

In order for the AMC method and the channel sensitive scheduling resource management method to help improve the system capacity substantially, the channel status information fed back by the receiver should be matched to the channel status at the transmission time. Generally, however, in the mobile communication environment, because the transmitter or the receiver moves from place to place, the channel status changes continuously. The continuous change in the channel status is related to moving velocity of the transmitter or the receiver, and this is called Doppler spread. High moving velocity deepens the Doppler spread. In this case, the channel status information fed back by the receiver may be invalid.

In this situation, therefore, even the use of the AMC method and the channel sensitive scheduling resource management method cannot accomplish system capacity improvement. To make up for the defects, the 3G wireless packet data communication system adopts Hybrid Automatic ReQuest (HARQ). In the HARQ technology, when a receiver fails to normally receive the data transmitted by a transmitter, the receiver immediately informs the transmitter of the failure so that the transmitter rapidly performs retransmission in a physical layer.

Meanwhile, an OFDM scheme, recently spotlighted in the wireless communication system, sends modulation signals on orthogonal frequency signals, that is, sub-carriers. Therefore, an OFDMA scheme is a method for sending different user signals on different sub-carriers based on the OFDM scheme. In the OFDMA scheme, channel sensitive scheduling which could be performed only in the time axis can be performed even in the frequency axis. That is, for data transmission, the OFDMA system schedules a sub-carrier preferred by each user in the frequency selective fading environment through frequency scheduling, thereby improving the system capacity as compared with the case where scheduling is performed only in the time axis. Therefore, in order to efficiently perform frequency scheduling, it is preferable to use a bundle of adjacent sub-carriers having a similar channel response for data transmission taking into account of overhead of the channel status feedback.

Further, a Multiple-Input Multiple-Output (MIMO) system using multiple antennas for a transmitter and a receiver is now under active discussion as a core technology for providing high-speed, high-quality data service in wireless communication. Theoretically, it is known in the MIMO system that as the number of transmission/reception antennas increases without an additional increase in frequency bandwidth, the serviceable data capacity linearly increases in proportion to the number of transmission/reception antennas. Therefore, the MIMO-based technology can be roughly divided into a Spatial Diversity technique and a Spatial Domain Multiplexing (SDM) technique according to its purpose. A description will now be made of the Spatial Diversity technique and the SDM technique.

The Spatial Diversity technique is developed to prevent a reduction in link performance due to fading occurring in a mobile communication channel by using multiple transmission/reception antennas. The Spatial Diversity technique can efficiently reduce a reception error probability, when a transmitter has channel status information and cannot adaptively adjust the amount of transmission information. The SDM technique is developed to transmit the larger amount of data using the MIMO scheme, as compared with the single-transmission/reception antenna technique. The SDM technique can efficiently increase data throughput in an environment where the spatial correlation is very low due to the scattering objects having a sufficient number of channel environments.

The SDM technique extended based on multiple access is a Spatial Domain Multiple Access (SDMA) technique. The SDM technique increases the number of transmission channels over which data is transmitted, using multiple transmission/reception antennas. In an environment where the spatial correlation is low, it is possible to increase the data throughput using the SDM technique. However, in an environment where the spatial correlation is high, even though the data throughput is increased, it is not possible to prevent an increase in the reception error probability. However, in an environment where the spatial correlation is high, if transmission channels over which the data (the amount of which is increased with the use of the MIMO scheme) is transmitted are allocated to different users, it helps increase the system capacity. This is because if the spatial correlation is high, interference between user signals having different spatial characteristics may decrease. That is, the SDMA technique is a spatial processing technique capable of increasing the system capacity in the high-spatial correlation environment.

Each of such spatial processing techniques as Spatial Diversity technique, SDM technique and SDMA technique differs in available scope according to traffic type and channel environment showing capacity improvement. For example, for a voice call, because similar amounts of data are always generated, it is difficult to apply the AMC method and the channel sensitive scheduling resource management method, both of which vary the data throughput. In addition, if the channel status becomes bad due to fading, a reception error is unavoidable. In this situation, the use of the Spatial Diversity technique can prevent the channel status from deteriorating. In the channel environment where the spatial correlation is low, the use of the SDM technique can increase the data throughput, together with the AMC method and the channel sensitive scheduling resource management method. In the channel environment where the spatial correlation is high, the SDMA technique can improve the system capacity. Therefore, there is a need to appropriately select the spatial processing technique according to the channel environment and traffic type.

A description will now be made of a transmitter for each of the systems described above.

FIG. 1 is a diagram illustrating a structure of a transmitter in a wireless communication system employing Space-Time Coding (STC). With reference to FIG. 1, a description will now be made of an apparatus and method for transmitting data using STC coding.

If data (such as an information bit stream) 10 that an upper layer desires to transmit is received, the data 10 is input to an AMC unit 100. The AMC unit 100 includes therein a channel coding/modulation unit 110 and an AMC controller 101. The channel coding/modulation unit 110 includes therein a channel encoder 111, a channel interleaver 112, and a modulator 113. Therefore, the data 10 is input to the channel encoder 111. The data coded by the channel encoder 111 is dispersed (or permutated) by the channel interleaver 112. The reason for dispersing the data by the channel interleaver 112 is to prevent deterioration of coding performance due to fading during data transmission. The data dispersed by the channel interleaver 112 is converted into a modulation signal by the modulator 113. A series of processes where the data undergoes coding 111, interleaving 112, and modulation 113 is called a "channel coding and modulation" process. Therefore, this process is performed in the channel coding/modulation unit 110.

The channel coding/modulation unit 110 can apply a different scheme depending on Channel Status Information (CSI) feedback 105 that a receiver has delivered according to the system. For example, if the channel status is good, the channel coding/modulation unit 110 increases a channel coding rate and a modulation order so that the increased amount of data is transmitted. However, if the channel status is bad, the channel coding/modulation unit 110 decreases the coding rate and the modulation order so that the decreased amount of data is transmitted more reliably. In this way, the transmitter applies AMC based on the CSI feedback 105, and the AMC controller 101 determines which coding and modulation schemes it will use. The AMC controller may be omitted, according to the particular design. That is, it is meant in FIG. 1 that the signals shown by a dotted line are optional. For example, in the case where several users receive the same information such as a broadcast, because it is not possible to adaptively change the coding and modulation schemes according to a channel status of a particular user, the transmitter need not support AMC. A process in which the AMC controller 101 adaptively changes the channel coding and modulation schemes based on the CSI feedback 105 is called an AMC process. Therefore, an apparatus provided for performing the AMC process is shown as an AMC unit 100 in FIG. 1.

The signal modulated by the AMC unit 100 is STC-coded by an STC encoder 121. The STC encoder 121 typically adopts an Alamouti coding method, which is applied to two transmission antennas. The Alamouti coding method, which corresponds to Orthogonal Space Time Coding (OSTC), can obtain the maximum diversity gain. In the Alamouti coding method, there should be no change in the channel between Alamouti-coded adjacent time signals in order to maintain orthogonality. If the channel between the adjacent time signals undergoes an abrupt change, the Alamouti coding method cannot guarantee orthogonality, causing self-interference and performance deterioration due thereto.

However, it is known that the OSTC coding method guaranteeing orthogonality provides the maximum diversity gain. The general STC coding method is performed without depending on the CSI that the receiver feeds back. Therefore, the STC coding method is designed to maximize the diversity gain, rather than being modified to be adaptive to the channel. The signal obtained by STC-coding the modulation signal is converted into a transmission band signal by a Radio Frequency (RF) unit 122, generating a plurality of symbols to be transmitted via multiple transmission antennas 131 through 132. For example, the STC coding method applied to a 2-transmission antenna system receives one data stream and outputs two symbol streams. The generated symbol streams are transmitted via different transmission antennas 131 and 132.

The symbol stream to which the STC coding method is applied is converted by the RF unit 122 into an RF signal to be transmitted via a transmission antenna. The RF unit 122 performs filtering for satisfying a spectrum characteristic, adjusts transmission power, and converts a baseband signal into an RF signal. After this process, the output signals are transmitted via their associated antennas 131 and 132.

FIG. 2 is a diagram illustrating a structure of a transmitter employing OFDM-STC coding. With reference to FIG. 2, a description will now be made of a structure and operation of a transmitter employing OFDM-STC coding.

An AMC unit 100 is equal to that of FIG. 1 in operation, so a description thereof is omitted here. The signal modulated by the AMC unit 100 is input to an OFDM modulator 210. The OFDM modulator 210 includes therein an Inverse Fast Fourier Transform (IFFT) unit 211 and a Cyclic Prefix (CP) symbol adder 212. Therefore, the signal modulated by the AMC unit 100 is input to the IFFT unit 211. The IFFT unit 211 performs IFFT on the modulation signal such that the modulated signals should be carried on orthogonal frequency signals, that is, sub-carriers. Thereafter, a CP symbol is added to the IFFT-processed signal by the CP symbol adder 212. The CP is achieved by copying a part of the last part of a generated sub-carrier and adding the copied part to the head of the symbol, to maintain the orthogonality between sub-carriers even though delay spread occurs due to multi-path fading, thereby preventing interference. If OFDM symbols are generated by the OFDM modulator 210, an STC encoder 121 performs STC coding on consecutive OFDM symbols. Thereafter, an RF unit 122 converts the STC-coded OFDM symbols into transmission band RF signals, and then transmits the RF signals via multiple transmission antennas 131 and 132. In the transmitter employing OFDM-STC coding, if a change in the channel between consecutive OFDM symbols is considerable, the orthogonality may be affected, causing interference.

FIG. 3 is a block diagram illustrating a structure of a transmitter employing OFDM-SFC coding. A description will now be made of a structure and operation of a transmitter employing OFDM-SFC (Space Frequency Coding) coding.

In the OFDM scheme, modulation signals can be carried on different frequencies at different times. Therefore, an SFC coding method can be implemented by applying the STC coding method to consecutive frequency signals, that is, sub-carriers, instead of applying the STC coding method to consecutive time signals. An AMC unit 100 outputs a modulated signal using an input information bit stream 10 and SCI feedback information 105. The output modulation signal is input to an SFC encoder 300. The SFC encoder 300 performs the same process as the STC coding process, but finally applies STC coding to the consecutive frequency signals, so this coding method is called an SFC coding method. The signal stream modulated by the SFC encoder 300 is obtained by applying STC coding to consecutive time signals. One stream is coded into a plurality of streams by the SFC encoder 300, and the streams are separately modulated by ODFM modulators 210a to 210n. The STC-coded signals are converted into OFDM signals by the OFDM modulators 210a to 210n. It can be considered herein that the STC coding applied to the consecutive time signals by the OFDM modulators 210a to 210n are applied to consecutive frequency signals. Thereafter, the OFDM signals are converted into transmission signals by an RF unit 122, and then transmitted via associated transmission antennas 131 and 132. In the transmitter employing OFDM-SFC coding, if a change in the channel between consecutive sub-carriers is considerable, the orthogonality may be affected, causing interference.

FIGS. 2 and 3 respectively show a transmission scheme employing STC coding, and a transmission scheme employing SFC coding that implements STC coding in the frequency axis. Such conventional techniques were designed to obtain the maximum spatial diversity gain, as described above. Therefore, such techniques show excellent link performance in the low-spatial correlation environment, but cannot provide a multi-antenna gain if the spatial correlation increases. The reason for showing the excellent link performance in the low-spatial correlation environment is because the use of the diversity technique, like other kinds of diversity techniques, can reduce the change in channel with the passage of time. However, the diversity technique helps reduce the probability of channel deterioration by reducing the change in the channel, but reduces a large number of channels capable of transmitting data. For this reason, it is known that in the system supporting AMC and channel sensitive scheduling, the diversity technique reduces the system capacity undesirably.

FIG. 4 is a block diagram illustrating a structure of a transmitter employing OFDM-based spatial multiplexing. With reference to FIG. 4, a description will now be made of a structure and operation of a transmitter employing OFDM-based spatial multiplexing.

Before a description of FIG. 4 is given, the foregoing techniques and a spatial multiplexing technique will be described in brief. With the use of multiple transmission antennas, the STC coding technique and the SFC coding technique transmit one data stream, whereas the spatial multiplexing technique transmits a plurality of data streams. In the channel environment where the low-spatial correlation MIMO scheme is used because of a large number of scattering objects, a predetermined number of data streams can be transmitted, wherein the predetermined number corresponds to a smaller one from among the number of transmission antennas and the number of reception antennas. For example, in the above channel environment, if the number of transmission antennas is 2 and the number of reception antennas is 4, the transmitter can transmit 2 data streams. Therefore, in order for the system of FIG. 4 to stably operate, the receiver also needs more than M antennas. For reference, because the STC coding technique and the SFC coding scheme transmit only one data stream, they do not need a plurality of reception antennas.

In the MIMO system, it is known that in order to increase the capacity, it is preferable to increase the number of transmission data streams rather than improving a Signal-to-Noise Ratio (SNR) with the number of transmission data streams being fixed to one. Therefore, the spatial multiplexing technique uses such characteristics of the MIMO system.

Referring to FIG. 4, transmission data streams are individually input to AMC units 100a to 100n where they undergo an AMC process independently. Thereafter, the resulting streams are OFDM-modulated by OFDM modulators 210a to 210n. The OFDM-modulated symbols are converted into RF transmission signals by an RF unit 122, and then transmitted to a receiver via multiple transmission antennas 131 and 132. That is, different data streams are transmitted via different transmission antennas. The AMC units 100a to 100n shown in FIG. 4 can be used when the system performs CSI feedback. If the CSI is not fed back, the fixed coding and modulation schemes are performed. In this case, the AMC units 100a to 100n perform the fixed coding and modulation schemes.

In the spatial multiplexing technique, there are two methods of performing AMC using CSI feedback. A first method applies the same AMC method for all transmission antennas. In order to support this method, a receiver is allowed to feed back only one representative CSI. A second method applies different AMC methods for all transmission antennas. In order to support this method, the receiver should feed back a CSI corresponding to each of the transmission antennas. That is, the former method is less than the latter method in terms of the CSI feedback overhead. However, in the former method, because only one AMC is applied to different transmission antennas experiencing different channel statuses, the capacity improvement effect of the system supporting AMC and channel sensitive scheduling is reduced. FIG. 4 shows the latter method that allows the receiver to feed back a CSI for each of the transmission antennas, and shows the transmitter employing an AMC method according thereto. Such a spatial multiplexing method is known as Per Antenna Rate Control (PARC).

FIG. 5 is a block diagram illustrating a structure of a transmitter employing PARC in a system supporting AMC and channel sensitive scheduling. With reference to FIG. 5, a description will now be made of a structure and operation of a transmitter employing PARC in a system supporting AMC and channel sensitive scheduling.

A scheduler 501 receives transmission data 10a to 10n of K multiple users from an upper layer. Herein, the scheduler 501 is a channel sensitive scheduler (hereinafter referred to as "scheduler" for simplicity). The scheduler 501 selects the most preferred user terminal to which it will transmit data at the present time, based on the CSI fed back from each user terminal. In order to deliver the necessary control information in the following process of transmitting data of the selected user, the scheduler 501 provides scheduling information 510 to an AMC controller 505. Then the AMC controller 505 analyzes the scheduled user and issues an AMC command according to a channel status of the user. That is, the scheduler 501 generates the information indicating via which antenna and with which coding and modulation methods it will transmit transmission data, and provides the generated information to the AMC controller 505. Therefore, the AMC controller 505 can determine the number of transmission data streams and a size of the transmission data for each individual antenna, based on the information on the transmission antennas.

A multiplexer 503 multiplexes user information bit stream scheduled by the scheduler 501 according to the number of transmission antennas and a data rate for each individual antenna based on the information provided from the AMC controller 505. For example, the multiplexer 503 multiplexes the scheduled user's information bit stream such that the larger amount of data stream should be transmitted via the transmission antenna having a good channel status. In the next process, PARC is applied to the multiplexed data stream. That is, the multiplexed data streams are individually input to channel coding/modulation units 110a to 110m where they are coded and modulated. The coded/modulated data streams are individually input to OFDM modulators 210a to 210m where they are OFDM-modulated. Thereafter, the OFDM-modulated data streams are converted into RF signals, and transmitted via associated antennas 131 to 132.

The system shown in FIG. 5 selects only one user at the transmission time and transmits data streams over the full band. That is, the system is not an OFDMA system. However, it is possible to simply extend the system to an OFDMA system supporting AMC and channel sensitive scheduling by dividing the full system band into sub-channels each composed of adjacent sub-carriers and independently applying PARC to each of the sub-channels. However, because only one user signal is transmitted via a plurality of antennas, SDMA is not implemented.

The two different spatial processing techniques have been described as the conventional MIMO technology.

The first technique, a spatial diversity technique, fixes the number of transmission data streams to one to reduce the change in the channel with the passage of time. The second technique, a spatial multiplexing technique, transmits a plurality of data streams.

The STC coding and SFC coding techniques described in FIGS. 2 and 3 can be classified as the spatial diversity technique. As described above, the diversity technique helps reduce the probability of channel deterioration by reducing the change in the channel, but reduces a large number of channels capable of transmitting data. For this reason, it is known that the spatial diversity technique reduces the system capacity undesirably. However, the spatial diversity helps broaden the coverage for the traffic that the transmitter can hardly change the transmission method according to the channel status, like the broadcast.

Although the STC coding technique and the SFC coding technique were designed to maintain orthogonality in order to obtain the maximum spatial diversity gain, if the adjacent channels change, the techniques cause self-interference undesirably. For example, the STC coding technique helps complement the AMC and channel sensitive scheduling in the fast-moving environment, but decreases in link performance undesirably because the orthogonality is damaged. In the case of the SFC coding technique, because adjacent sub-carriers experience different channel responses in the environment where the time delay spread is considerable, the link performance deteriorates even in this case due to the affect on orthogonality.

The PARC technique described in FIGS. 4 and 5 can be classified as a spatial multiplexing technique. The PARC technique has disadvantages in that reception performance deteriorates in the high-spatial correlation environment. Because the PARC technique performs AMC by feeding back only the channel status of each individual transmission channel, it undesirably transmits the data whose amount exceeds the capacity supportable by the channel in the high-spatial correlation environment. The high spatial correlation means that there is a high probability that when one transmission antenna experiences a good channel status, other transmission antennas will also experience the good channel status. However, because the channels experienced by different antennas are similar to each other, the receiver cannot separate the signals transmitted from the different antennas. Therefore, interference occurs between the simultaneously transmitted streams, deteriorating the reception link performance. The PARC technique cannot avoid the deterioration of the reception link performance due to spatial correlation because it was designed on the assumption that the channels have no spatial correlation.

As another problem, the PARC technique does not support SDMA. The system supporting AMC and channel sensitive scheduling improves the system capacity by obtaining a multi-user diversity gain. The multi-user diversity selects a proper user through scheduling in the channel-varying mobile communication environment and transmits data to the selected user. The system capacity decreases undesirably as compared with the environment where the channels do not vary. Accordingly, there is a need for an improved apparatus and method for transmitting/receiving data in a multi-antenna communication system.

SUMMARY OF THE INVENTION

It is, therefore, an object of embodiments of the present invention to provide an apparatus and method for increasing system capacity in an OFDMA system employing an AMC method and a channel sensitive scheduling resource management method.

It is another object of embodiments of the present invention to provide an apparatus and method for increasing data transmission/reception efficiency by applying various MIMO techniques such as beamforming, spatial diversity and SDMA, in an OFDMA system.

It is still another object of embodiments of the present invention to provide an apparatus and method for reducing the amount of CSI feedback in an OFDMA system.

According to one aspect of the present invention, there is provided a method for transmitting data in a base station of a wireless communication system that transmits data depending on channel status information fed back from terminals and uses a plurality of antennas in a Multiple-Input Multiple-Output (MIMO) scheme. The method includes determining a terminal to which the base station will transmit data based on the channel status information, determining antennas via which the base station will transmit data among the plurality of antennas, and determining a space pre-coding method; multiplexing transmission data into a plurality of data streams according to the number of the determined antennas, and performing coding and modulation on each of the data streams; outputting a matrix select signal for selecting one of a plurality of space pre-coding matrixes according to the space pre-coding method, and spatial-coding each of the coded streams with the matrix selected based on the matrix select signal; and performing Orthogonal Frequency Division Multiplexing (OFDM) modulation on each of the spatial-coded streams, and transmitting each of the OFDM-modulated streams via an associated antenna.

According to another aspect of the present invention, there is provided an apparatus for transmitting data in a base station of a wireless communication system that transmits data depending on channel status information fed back from terminals and uses a plurality of antennas in a Multiple-Input Multiple-Output (MIMO) scheme. The apparatus includes a scheduler for determining a terminal to which the base station will transmit data based on the channel status information, determining antennas via which the base station will transmit data among the plurality of antennas, and determining a space pre-coding method; a multiplexer for multiplexing transmission data into a plurality of data streams according to the number of the determined antennas; a modulation and coding unit for performing modulation and coding on each of the data streams; a pre-coding controller for outputting a matrix select signal for selecting one of a plurality of space pre-coding matrixes according to the space pre-coding method; a space pre-coder for spatial-coding each of the coded streams with the matrix selected based on the matrix select signal; an Orthogonal Frequency Division Multiplexing (OFDM) modulator for performing OFDM modulation on each of the spatial-coded streams; and a radio frequency (RF) unit for transmitting each of the OFDM-modulated streams via an associated antenna.

According to still another aspect of the present invention, there is provided an apparatus for transmitting data in a base station of a wireless communication system that transmits data depending on channel status information fed back from terminals and uses a plurality of antennas in a Multiple-Input Multiple-Output (MIMO) scheme. The apparatus includes a scheduler for, determining a terminal to which the base station will transmit data based on the channel status information, and determining antennas via which the base station will transmit data among the plurality of antennas; a multiplexer for multiplexing transmission data into a plurality of data streams according to the number of the determined antennas; a modulation and coding unit for performing modulation and coding on each of the data streams; a pre-coding controller for outputting a space pre-coding command to be applied to data streams to be transmitted to a selected terminal; a space pre-coder for spatial-coding each of the coded streams selected based on the space pre-coding command; an Orthogonal Frequency Division Multiplexing (OFDM) modulator for performing OFDM modulation on each of the spatial-coded streams; and a radio frequency (RF) unit for transmitting each of the OFDM-modulated streams via an associated antenna.

According to yet another aspect of the present invention, there is provided a method for transmitting data in a base station of a wireless communication system that transmits data depending on channel status information fed back from terminals and uses a plurality of antennas in a Multiple-Input Multiple-Output (MIMO) scheme. The method includes determining a terminal to which the base station will transmit data based on the channel status information, and determining antennas via which the base station will transmit data among the plurality of antennas; multiplexing transmission data into a plurality of data streams according to the number of the determined antennas; performing modulation and coding on each of the data streams; determining a space pre-coding method to be applied to data streams to be transmitted to a selected terminal, and spatial-coding each of the data streams using the determined space pre-coding method; performing Orthogonal Frequency Division Multiplexing (OFDM) modulation on each of the spatial-coded streams; and transmitting each of the OFDM-modulated streams via an associated antenna.

According to still another aspect of the present invention, there is provided an apparatus for receiving data by a terminal in a wireless communication system that transmits data depending on channel status information fed back from terminals and uses a plurality of antennas in a Multiple-Input Multiple-Output (MIMO) scheme. The apparatus includes a transmission antenna pilot extractor for extracting a pilot signal transmitted via each transmission antenna from a signal received from each antenna; a MIMO channel estimator for estimating a MIMO channel using information received from the transmission antenna extractor; a pre-coding MIMO channel estimator for estimating a pre-coded MIMO channel using the estimated MIMO channel and pre-coding information; a data extractor for extracting data from the received signal; a combining and demultiplexing unit for combining and demultiplexing the data extracted by the data extractor using the signal output from the pre-coding MIMO channel estimator; and a demodulation and decoding unit for demodulating and decoding the demultiplexed signal.

According to still another aspect of the present invention, there is provided a method for receiving data by a terminal in a wireless communication system that transmits data depending on channel status information fed back from terminals and uses a plurality of antennas in a Multiple-Input Multiple-Output (MIMO) scheme. The method includes extracting a pilot signal transmitted via each transmission antenna from a signal received from each antenna; estimating a MIMO channel using the extracted pilot signal; estimating a pre-coded MIMO channel using the estimated MIMO channel and pre-coding information; extracting data from the received signal; combining and demultiplexing the extracted data using the estimated pre-coded MIMO channel; and demodulating and decoding the demultiplexed signal.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numbers should be understood to refer to like elements, features and structures.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

As described above, multi-user diversity provides more gain as the level where it can perform scheduling increases. In the 3G mobile communication system such as HSDPA, EV-DV and EV-DO, scheduling is performed only in the time axis. However, in the OFDMA system, the scheduling can be performed in both the time and frequency axes, increasing the system capacity. Therefore, the purpose of SDMA described herein is to perform scheduling not only in the time and frequency axes but also in the spatial axis, thereby improving a multi-user diversity gain and increasing the system capacity.

With reference to the accompanying drawings, a description will now be made of exemplary embodiments of the present invention.

Figure 6:
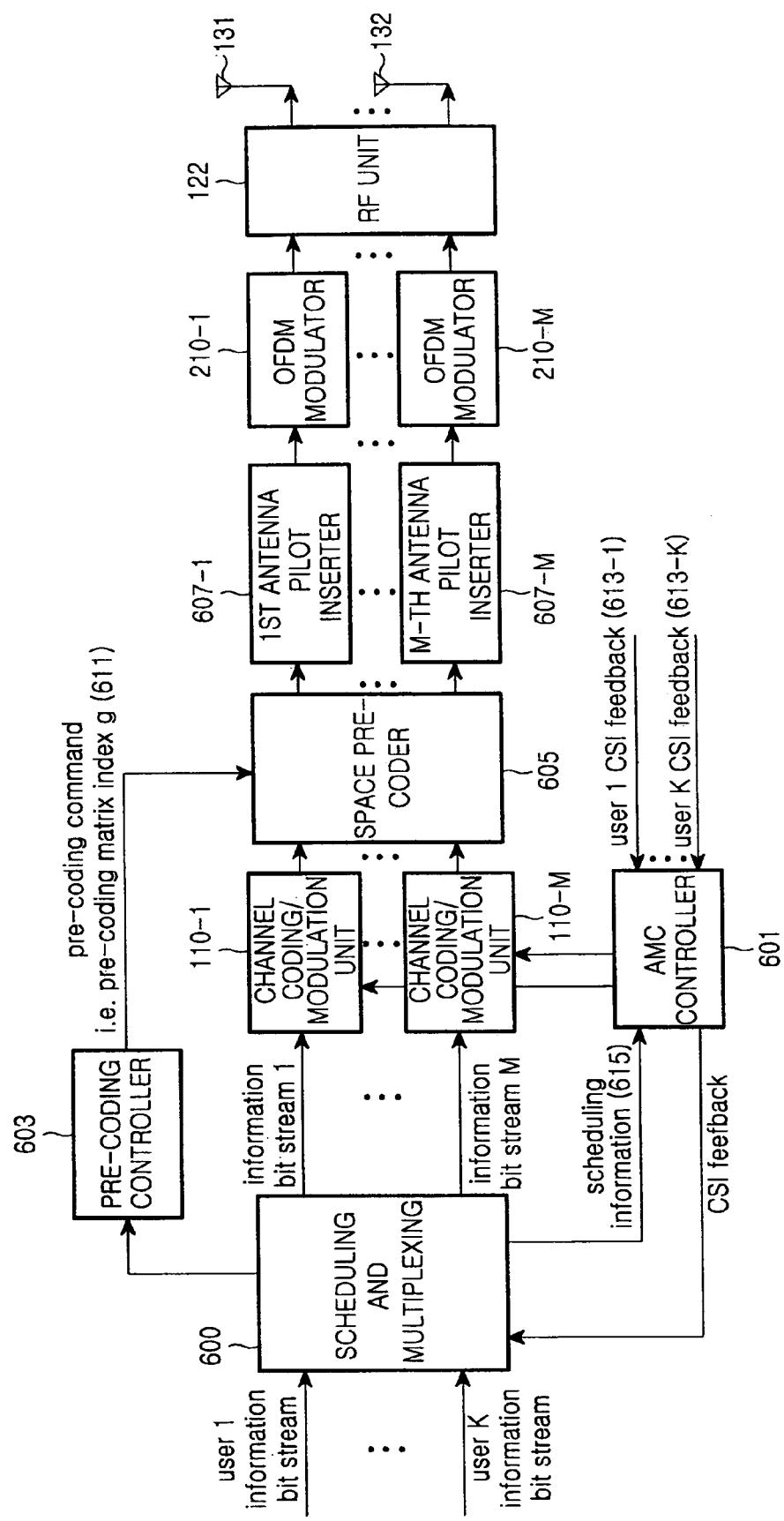
FIG. 6 is a block diagram illustrating a structure of a multi-user MIMO transmitter employing space pre-coding according to an exemplary embodiment of the present invention.

FIG. 6 is a block diagram illustrating a structure of a multi-user MIMO transmitter employing space pre-coding according to an exemplary embodiment of the present invention.

For convenience, FIG. 6 shows a MIMO transmitter in an OFDM-TDMA system that uses OFDM instead of the extended OFDMA as a multiplexing scheme and uses TDMA as a multiple access scheme. The system of FIG. 6 can also be simply extended to the OFDMA system employing AMC and channel sensitive scheduling by dividing the full system band into sub-channels each composed of adjacent sub-carriers and independently applying PARC to each of the sub-channels.

Figure 1:
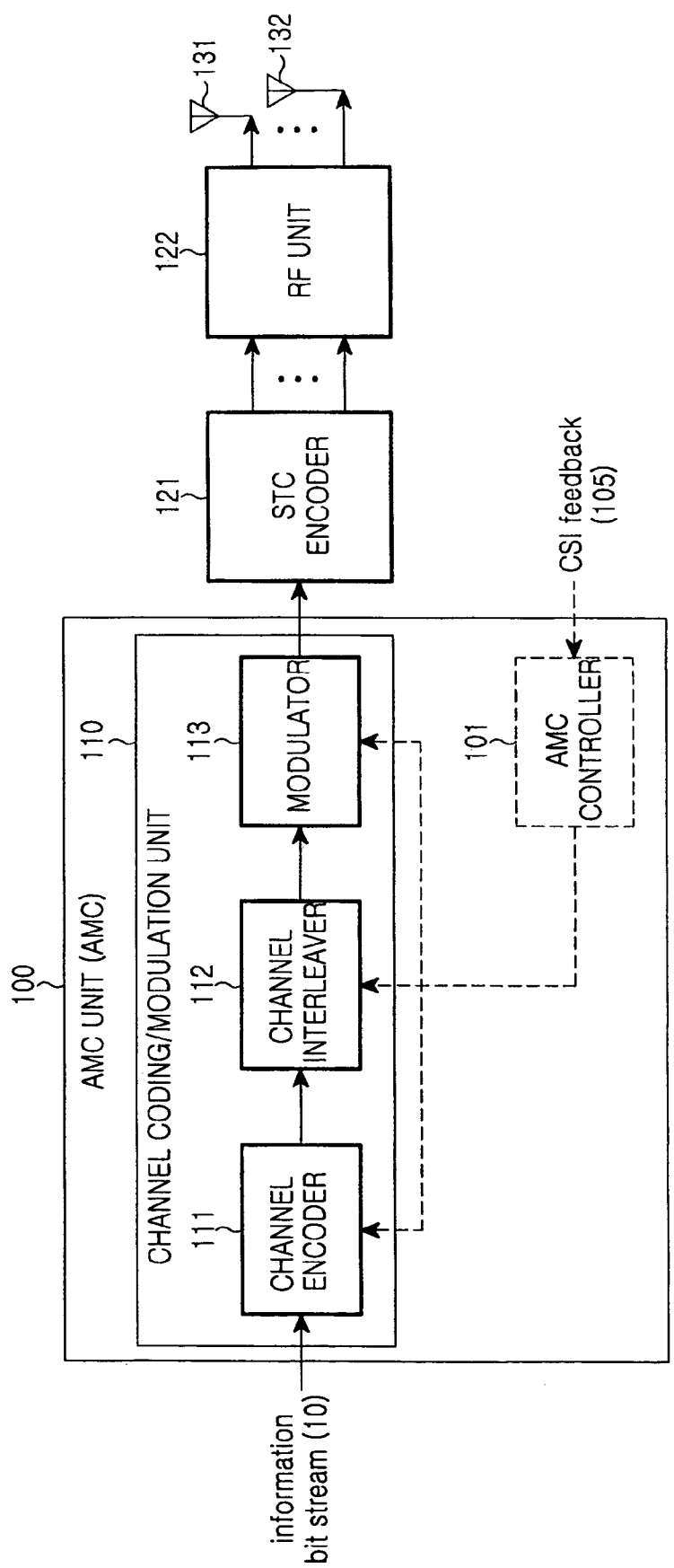
FIG. 1 is a diagram illustrating a structure of a transmitter in a wireless communication system employing Space-Time Coding (STC)
Figure 2:
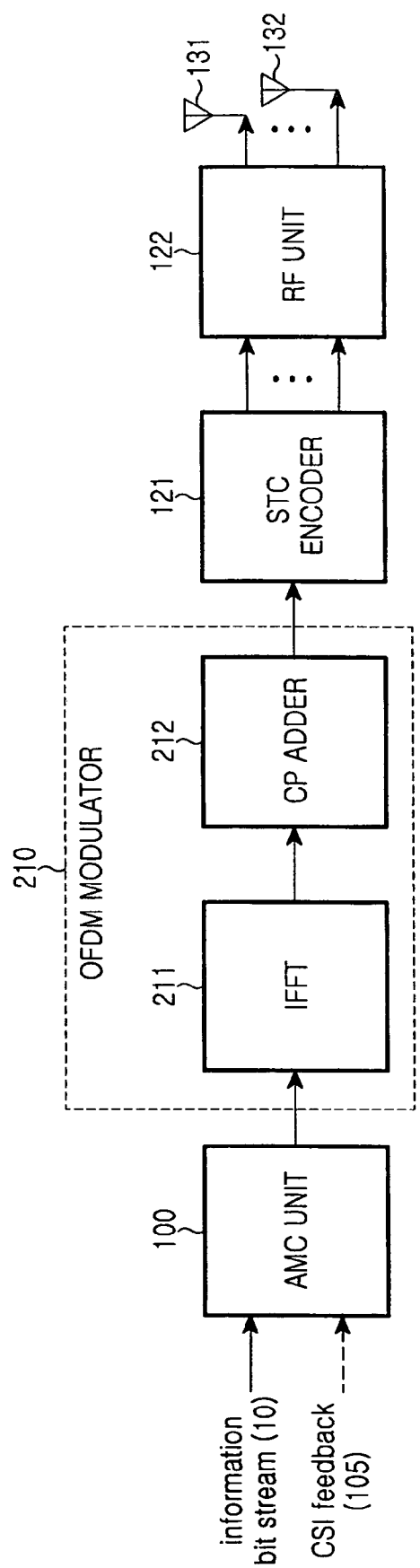
FIG. 2 is a diagram illustrating a structure of a transmitter employing OFDM-STC coding.
Figure 3:
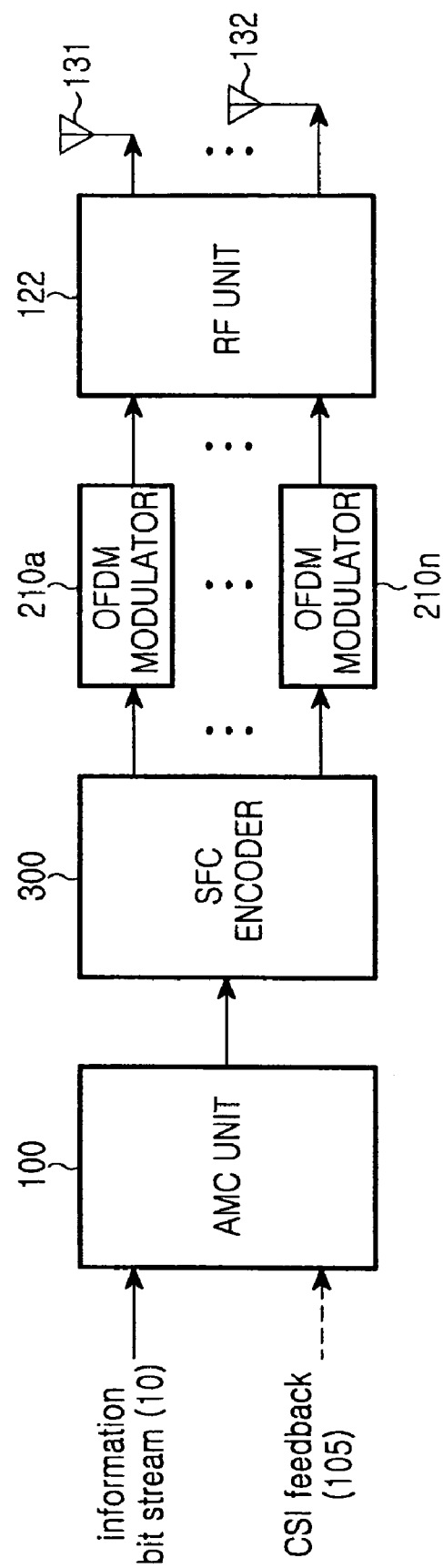
FIG. 3 is a block diagram illustrating a structure of a transmitter employing OFDM-SFC coding.
Figure 4:
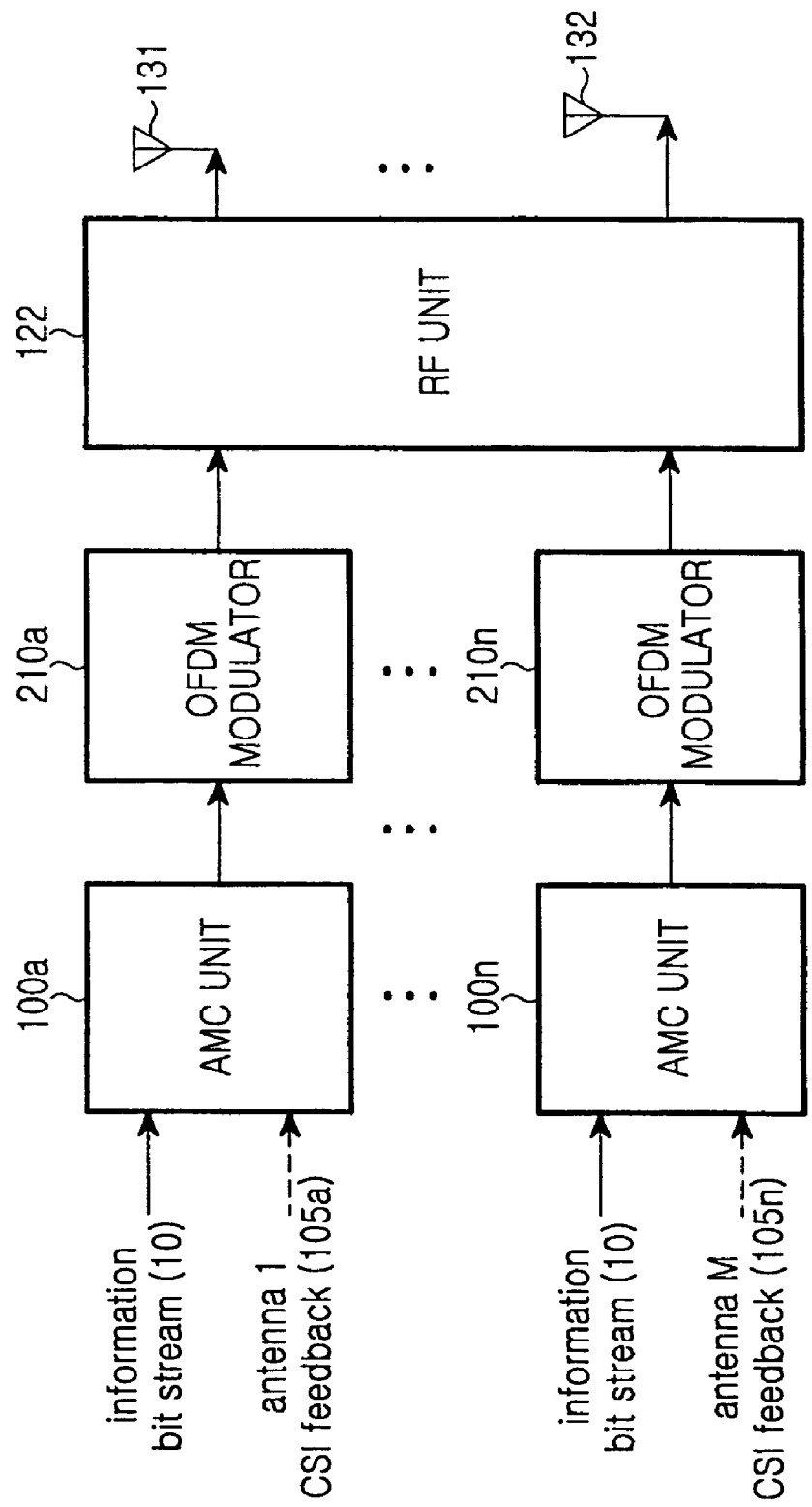
FIG. 4 is a block diagram illustrating a structure of a transmitter employing OFDM-based spatial multiplexing.
Figure 5:
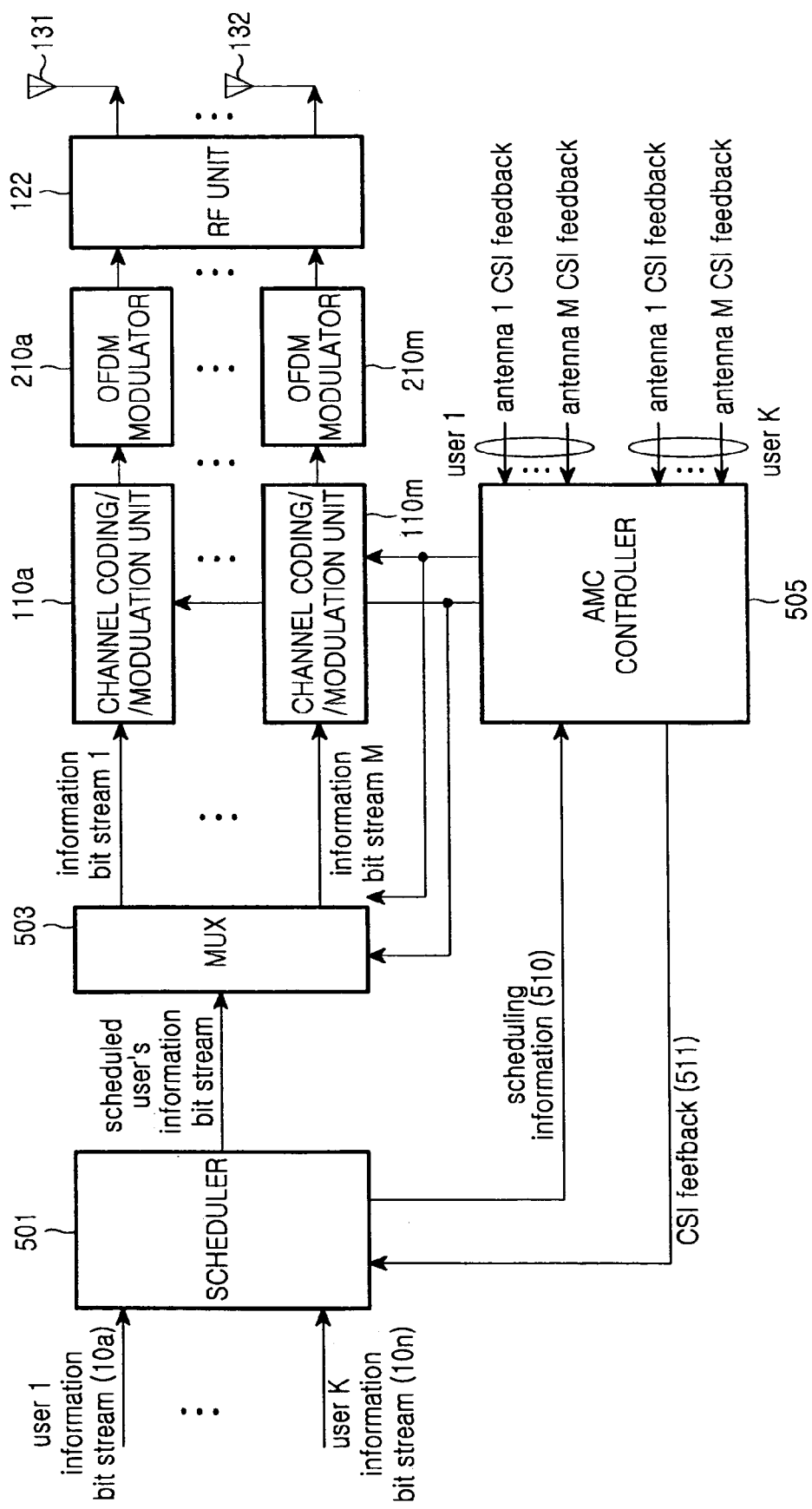
FIG. 5 is a block diagram illustrating a structure of a transmitter employing PARC in a system supporting AMC and channel sensitive scheduling.

Differences between FIG. 5 and FIG. 6 will now be described.

First, the new transmitter transmits multiple streams using a space pre-coder 605.

Second, a scheduler can select several user signals and transmit the selected user signals, instead of selecting one user signal and transmitting the selected signal.

The former difference not only prevents deterioration of reception link performance of PARC in the high-spatial correlation environment, but also helps implement SDMA. The latter difference realizes SDMA thereby improving multi-user diversity gain.

A characteristic of space pre-coding will first be described hereinbelow.

Generally, a MIMO channel can be expressed as a matrix having the channels between multiple transmission/reception antennas as elements. If the number of transmission antennas is M and the number of reception antennas is N, a determinant expressing the MIMO channel can be expressed as $$H = \begin{bmatrix} h_{11} & \Lambda & h_{1M} \\ M & O & M \\ h_{N1} & \Lambda & h_{NM} \end{bmatrix} \quad (1)$$

Herein, $h_{nm}$ denotes a channel response that when a signal transmitted from an $m^{th}$ transmission antenna is received at an $n^{th}$ reception antenna, the signal experiences. The space pre-coding can also be expressed as a determinant defined in Equation (2) below.

$$E = \begin{bmatrix} e_{11} & \Lambda & e_{1M} \\ M & O & M \\ e_{M1} & \Lambda & e_{MM} \end{bmatrix} \quad (2)$$

Herein, $e_{mp}$ denotes a coefficient multiplied when a $p^{th}$ modulation symbol is transmitted via an $m^{th}$ transmission antenna. It is assumed herein that multiple space pre-coding matrixes are provided and the space pre-coding matrix is changed according to circumstances. That is, the transmitter has G space pre-coding methods and selects one of them according to circumstances. A space pre-coding matrix corresponding to a $g^{th}$ space pre-coding method among the G space pre-coding methods is represented by $$E^{(g)} = \begin{bmatrix} e_{11}^{(g)} & \Lambda & e_{1M}^{(g)} \\ M & O & M \\ e_{M1}^{(g)} & \Lambda & e_{MM}^{(g)} \end{bmatrix} \quad (3)$$

The space pre-coding technique can be described as a beamforming technology. The matrix $E^{(g)}$ is composed of a total of M column vectors, and each of the column vectors is equal to a beamforming weight for transmitting one modulation symbol. Therefore, in order to point one beam, there is a need for a value 'g' indicating to which matrix the beam corresponds and a value 'm' indicating to which column vector in the matrix the beam corresponds. The space pre-coding technique simultaneously forms M beams. If the space pre-coding technique activates one only of the M beams and transmits a data stream, the general beamforming technology is implemented. In order to transmit a plurality of data streams to be transmitted to one user, if the space pre-coding technique activates the same number of beams and transmits the streams with individual beams, spatial multiplexing is implemented. If every beam carries a stream of a different user, SDMA is implemented. That is, the space pre-coding technique can simultaneously support various MIMO technologies such as transmission beamforming, spatial multiplexing, and SDMA.

The space pre-coding can be described as another method of linearly converting a MIMO channel. For example, a MIMO channel converted by the $g^{th}$ space pre-coding method is given as $$H_E^{(g)} = HE^{(g)} \qquad (4)$$

The MIMO channel can be converted into G different equivalent MIMO channels according to G space pre-coding methods. Because the users experience different MIMO channels, the space pre-coding method preferred by an individual user is different. With the use of the method of preparing a plurality of space pre-coding methods and changing the space pre-coding method according to circumstances, it is possible to obtain an additional multi-user diversity gain.

In exemplary embodiments of the present invention, elements of a pre-coding matrix for space pre-coding are defined as $$e_{mp}^{(g)} = \frac{1}{\sqrt{M}} \exp\left(j \frac{2\pi(m-1)}{M}\left(p - 1 + \frac{g-1}{G}\right)\right) \qquad (5)$$

$$= \frac{1}{\sqrt{M}} \exp\left(j \frac{2\pi(m-1)(p-1)}{M}\right) \exp\left(j \frac{2\pi(m-1)(g-1)}{MG}\right)$$

If the space pre-coding matrix is defined as Equation (5), it is a unitary matrix. If the space pre-coding matrix is a unitary matrix, there is no situation where the channel capacity of the MIMO channel is reduced by space pre-decoding.

A detailed description will now be made of the structure and operation of the transmitter shown in FIG. 6.

The transmitter receives CSIs from user receivers. Herein, the CSI feedback delivered by one user is divided in three methods according to space pre-coding technique.

A first method feeds back Channel Quality Information (CQI) for AMC for every beam that the space pre-coding process can make. If there are G space pre-coding matrixes and M transmission antennas, a total of GM CQIs are fed back as CSIs. This method is advantageous in that it can perform optimal scheduling by feeding back the largest amount of information. However, this method is disadvantageous in that overhead due to the feedback increases.

A second method notifies a preferred space pre-coding method, and feeds back CQIs only for M beams that can be made using the notified method. Therefore, the second method feeds back M CQIs and a Preferred Matrix Index (PMI) indicating the preferred space pre-coding matrix.

The above two methods both can be used for spatial multiplexing, and can also be used for transmission beamforming and SDMA according to a scheduling result.

A third method notifies a preferred space pre-coding method and a preferred beamforming method therein, and feeds back only one CQI that can be obtained through the beam. Therefore, one CQI, PMI, and Preferred Vector Index (PVI) indicating a preferred column vector are fed back as CSIs. Among the three methods, this method needs the least amount of feedback overhead. However, this method can be used only for transmission beamforming and single-stream transmission SDMA.

CSIs that receivers transmitted using one of the above methods are gathered in an AMC controller 601 and a scheduling and multiplexing unit 600. The scheduling and multiplexing unit 600 first determines a space pre-coding method based on the CSI feedback information, and selects a data stream to be delivered with each beam formed according to the determined method. If different users are simultaneously selected, SDMA is implemented. If the scheduling and multiplexing unit 600 determines to transmit a plurality of data streams from one user, it implements space pre-coding. In addition, if the scheduling and multiplexing unit 600 determines to transmit one data stream from one user, it implements transmission beamforming. Determining the space pre-coding method by the scheduling and multiplexing unit 600 means determining which space pre-coding matrix it will apply at the present time. The determined space pre-coding method is delivered to a pre-coding controller 603. Then the pre-coding controller 603 searches for a space pre-coding matrix index corresponding to the determined space pre-coding method, and delivers the space pre-coding matrix index to the space pre-coder 605. The scheduling and multiplexing unit 600 delivers determined scheduling information 615 to the AMC controller 601. Therefore, the AMC controller 601 determines a coding and modulation method to be applied in each beam based on the CSI feedback information, and delivers the determined methods to channel coding/modulation units 110-1 to 110-M. The scheduling and multiplexing unit 600 multiplexes a predetermined number of data streams determined to be transmitted among the user data streams received from an upper layer, wherein the predetermined number corresponds to the number of streams to be transmitted, and outputs the multiplexed streams to associated channel coding/modulation units 110-1 to 110-M.

Each of the channel coding/modulation units 110-1 to 110-M performs AMC on the data stream scheduled and multiplexed by the scheduling and multiplexing unit 600. The AMC-processed output signals are input to the space pre-coder 605. The space pre-coder 605 performs space pre-coding based on a pre-coding command, that is, a space pre-coding matrix index 611, determined by the pre-coding controller 603. Through this process, a symbol stream to be transmitted via each transmission antenna is completed. The space pre-coded symbol streams are input to pilot inserters 607-1 to 607-M associated with the antennas. The pilot inserters 607-1 to 607-M insert orthogonal pilot signals for the individual antennas, and output the pilot-inserted streams to associated OFDM modulators 210-1 to 210-M. The OFDM modulators 210-1 to 210-M convert the input signals into OFDM signals, and output the OFDM signals to an RF unit 122. The RF unit 122 converts the OFDM signals into RF signals, and transmits the RF signals via multiple transmission antennas 131 to 132.

Herein, the data streams undergo space pre-coding, but the pilot signals are not subject to space pre-coding. This is because even the user, to which no data is transmitted at the present time, should feed back CSI information in case that data will be transmitted at the next time. If space pre-coding is applied to a pilot for the user to which data is presently transmitted, the users to which no data is transmitted cannot recognize the fact. Therefore, the users to which no data is transmitted cannot generate CSI information from the pilot. If the orthogonal pilots are transmitted via the individual antennas in the transmitter of FIG. 6, each user receiver can generate CSI information using Equation (4).

Figure 7:
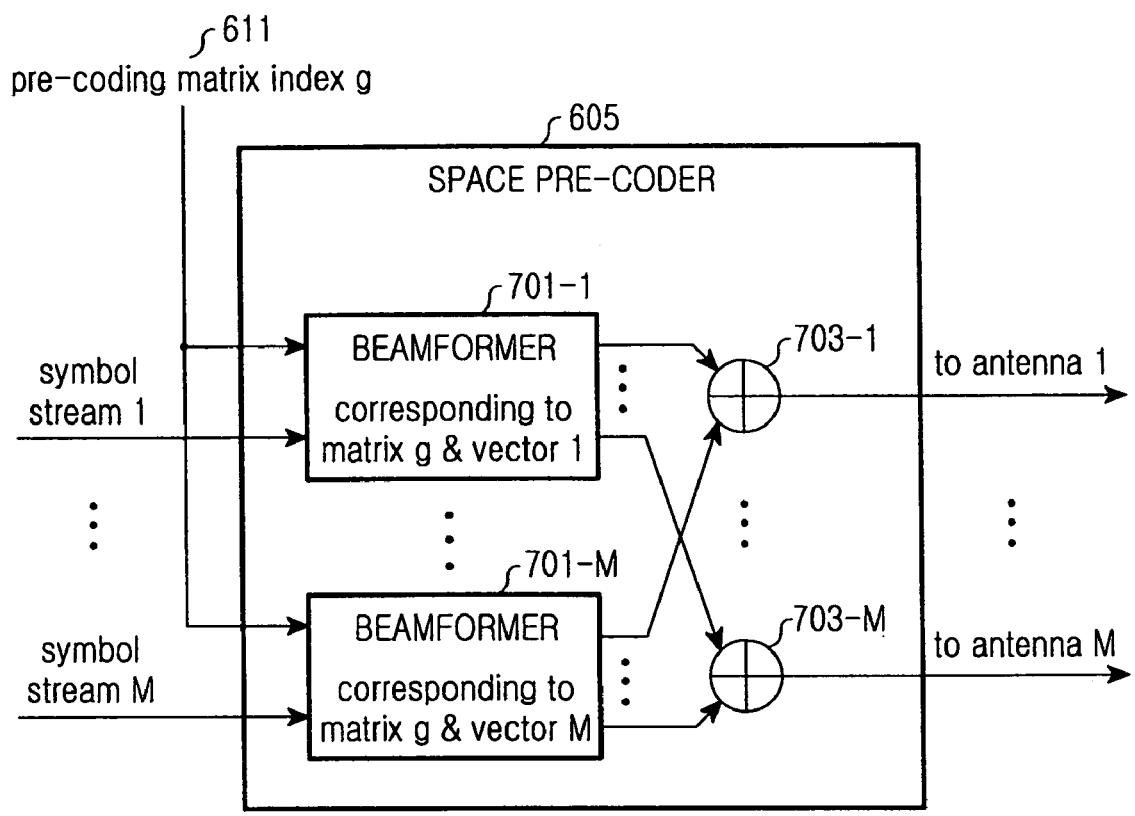
FIG. 7 is a block diagram illustrating the space pre-coder of FIG. 6 implemented with a beamformer according to an exemplary embodiment of the present invention.

FIG. 7 is a block diagram illustrating the space pre-coder of FIG. 6 implemented with a beamformer according to an exemplary embodiment of the present invention. With reference to FIG. 7, a description will now be made of a structure and operation of the space pre-coder according to an exemplary embodiment of the present invention.

If a pre-coding command, that is, space pre-coding matrix index 'g' 611, determined by the pre-coding controller 603 is delivered to the space pre-coder 605, a first beamformer 701-1 beam-forms a first column vector using a beamforming weight, and an $M^{th}$ beamformer 701-M beam-forms an $M^{th}$ column vector of $E^{(g)}$ using a beamforming weight. The signals beam-formed by the beamformers 701-1 to 701-M are added up by adders 703-1 to 703-M.

Figure 8:
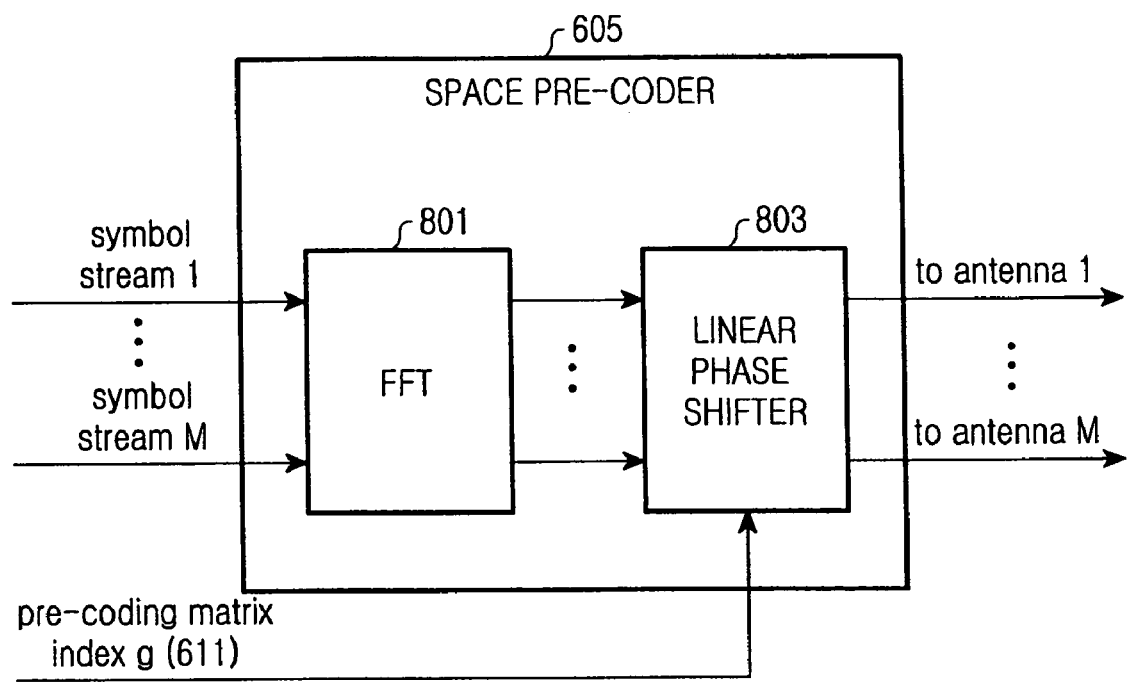
FIG. 8 is a block diagram illustrating the space pre-coder of FIG. 6 implemented with a Fourier transformer according to another exemplary embodiment of the present invention.

FIG. 8 is a block diagram illustrating the space pre-coder of FIG. 6 implemented with a Fourier transformer according to another exemplary embodiment of the present invention. With reference to FIG. 8, a description will now be made of a structure and operation of a space pre-coder according to another exemplary embodiment of the present invention.

If the space pre-coding matrix of Equation (5) is used, the space pre-coder 605 applies IFFT to the modulation symbols scheduled to be simultaneously transmitted. Therefore, the modulation symbols are input to a Fourier transformer 801 where they undergo IFFT. Herein, the IFFT can be replaced with Fast Fourier Transform (FFT) or Discrete Fourier Transform (DFT) according to transmission method. The Fourier-transformed streams are input to a linear phase shifter 803. The linear phase shifter 803 phase-shifts the input streams using the pre-coding command, that is, space pre-coding matrix index 'g' 611, determined by the pre-coding controller 603. The linear phase shifter 803 applies phase shifting of Equation (6) to a modulation symbol to be transmitted via an $m^{th}$ transmission antenna among the modulation symbols IFFT-processed by the Fourier transformer 801 using the space pre-coding matrix index 'g' 611.

$$\Phi_{mp}^{(g)} = \exp\left(j\frac{2\pi(m-1)(g-1)}{MG}\right) \quad (6)$$

The space pre-coder 605, as descried above, can replace the IFFT unit with FFT unit. In this case, elements of the space pre-coding matrix are defined as Equation (7), and phase shifting is defined as Equation (8).

$$e_{mp}^{(g)} = \frac{1}{\sqrt{M}}\exp\left(-j\frac{2\pi(m-1)}{M}\left(p-1+\frac{g-1}{G}\right)\right) \quad (7)$$

$$= \frac{1}{\sqrt{M}}\exp\left(-j\frac{2\pi(m-1)(p-1)}{M}\right)\exp\left(-j\frac{2\pi(m-1)(g-1)}{MG}\right)$$

$$\Phi_{mp}^{(g)} = \exp\left(-j\frac{2\pi(m-1)(g-1)}{MG}\right) \quad (8)$$

Figure 9:
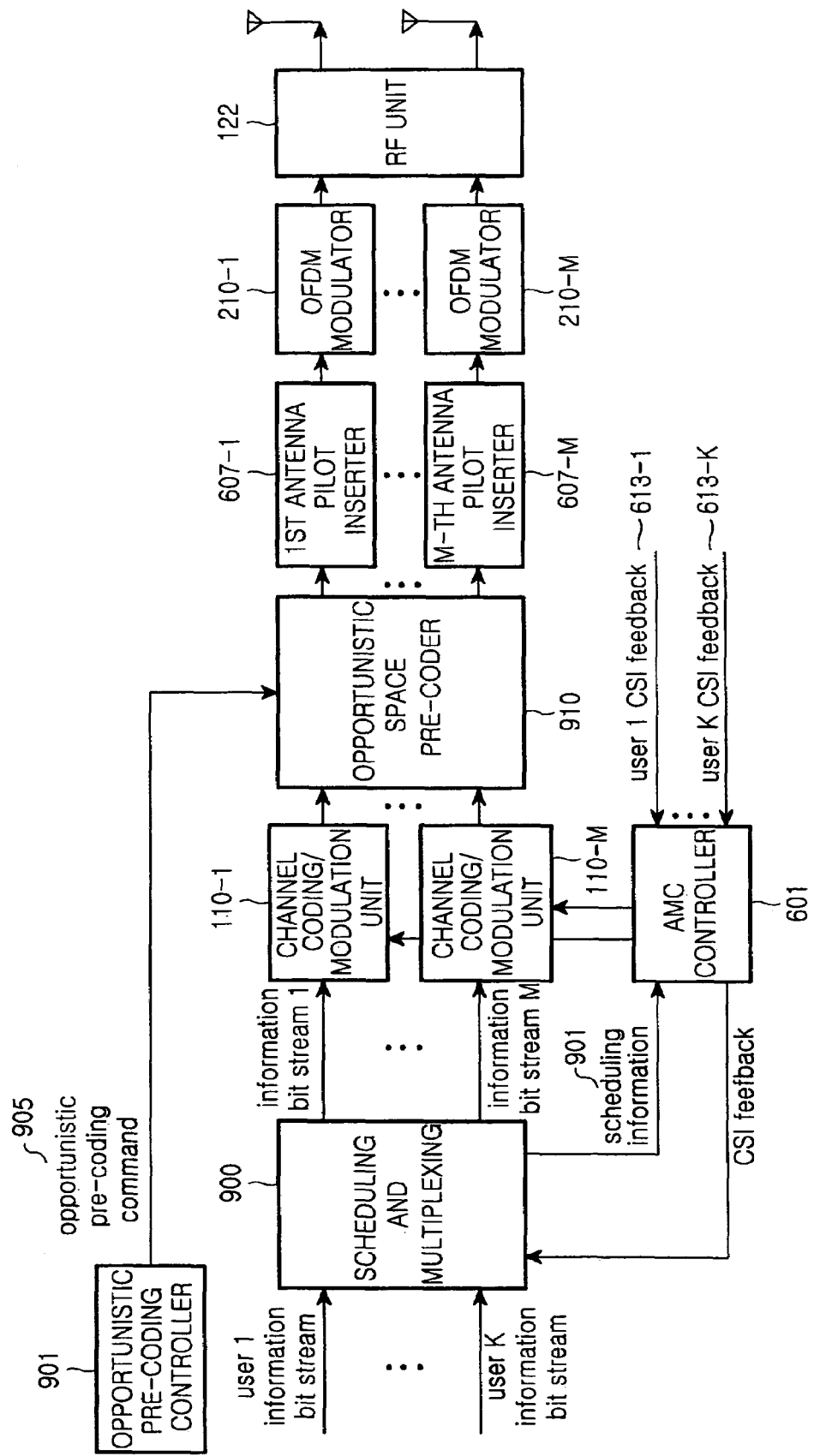
FIG. 9 is a block diagram illustrating a structure of a multi-user transmitter employing opportunistic space pre-coding according to another exemplary embodiment of the present invention.

FIG. 9 is a block diagram illustrating a structure of a multi-user transmitter employing opportunistic space pre-coding according to another exemplary embodiment of the present invention.

Before a description of FIG. 8 is given, it should be noted that the multi-user MIMO system employing the space pre-coding technique of FIG. 6 should feed back CQI for every case, or feed back an additional CSI, like the PMI and PVI.

Therefore, the MIMO system, compared with the PARC system, performs more feedback. The opportunistic space pre-coding technique, with the same feedback overhead as that of the PARC technique, can use various spatial processing techniques such as beamforming, spatial multiplexing and SDMA, which can be implemented using the space. pre-coding technique.

A notable difference in the transmitter structure between the opportunistic space pre-coding technique of FIG. 9 and the space pre-coding technique of FIG. 6 is that an opportunistic pre-coding controller 901 is not controlled by the scheduler. That is, the system employing the space pre-coding technique of FIG. 6 receives the CSI used for determining a space pre-coding method, fed back from a receiver, and based on the CSI information, the scheduler 600 determines which space pre-coding it will use at the preset time. However, the system employing the opportunistic space pre-coding technique of FIG. 9 determines a space pre-coding method depending on a predetermined pattern, rather than determining the space pre-coding method based on the CSI fed back from the receiver.

The opportunistic pre-coding controller 901 determines which space pre-coding it will apply in a specific sub-band and time slot which is a unit of AMC and channel sensitive scheduling, and delivers an opportunistic pre-coding command 905 to an opportunistic space pre-coder 910. The other process is equal to the corresponding space pre-coding process described in FIG. 6.

The opportunistic pre-coding controller 901 determines the opportunistic pre-coding command 905 in the following two methods.

A first method defines orders of space pre-coding methods, and sequentially changes the space pre-coding method.

A second method generates random variables and randomly determines the space pre-coding method.

Even though any one of the above two methods is used, the receiver should be able to expect which space pre-coding will be applied to a particular sub-band at the present time and the next scheduling time. That is, when the first method is used where the space pre-coding method is sequentially changed, the orders of the space pre-coding methods should be known by both the transmitter and the receiver. On the contrary, if the second method is used where the space pre-coding method is randomly changed, the transmitter and the receiver should set the same status of their random generators so that the same random variables may be generated. That is, the transmitter and the receiver should be synchronized for the space pre-coding method. By doing so, the receiver can predict the pre-coded MIMO channel at the present time, and can estimate the pre-coded MIMO channel at the next scheduling time. The reason why there is no problem in operation even though the space pre-coding method is changed according to time and frequency in this way is because orthogonal pilots are transmitted from different antennas, so that the MIMO channels to which the space pre-coding is not applied can be used. In addition, because the receiver is aware of which space pre-coding was applied and will be applied, it can perform reception and CSI feedback operations.

Figure 10:
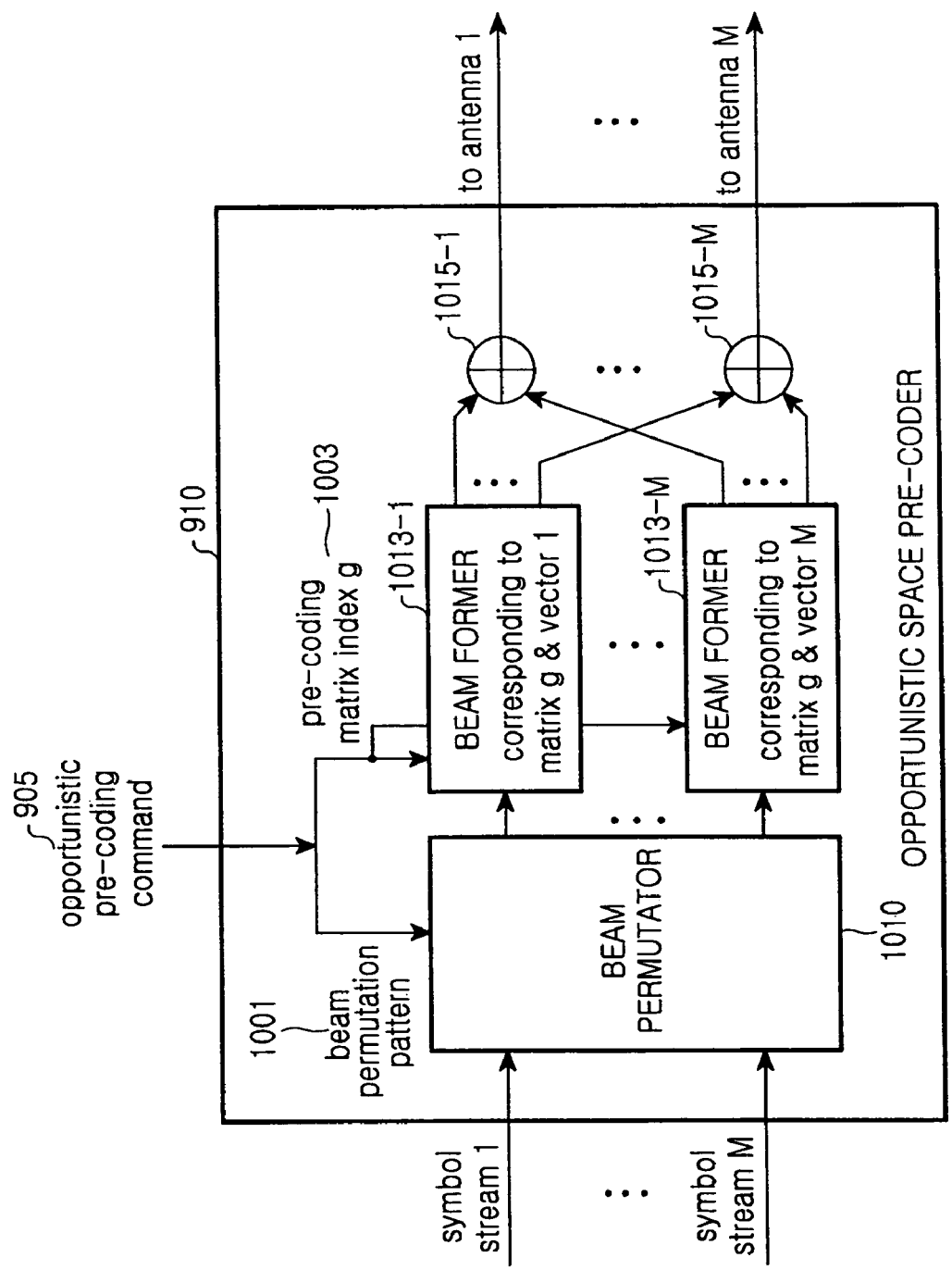
FIG. 10 is a block diagram illustrating a structure of the opportunistic space pre-coder of FIG. 9 implemented with a beamformer according to an exemplary embodiment of the present invention.

FIG. 10 is a block diagram illustrating a structure of the opportunistic space pre-coder of FIG. 9 implemented with a beamformer according to an exemplary embodiment of the present invention. With reference to FIG. 10, a description will now be made of a structure and operation of the opportunistic space pre-coder according to an exemplary embodiment of the present invention.

The opportunistic pre-coding command 905 generated by the opportunistic pre-coding controller 901 is composed of a beam permutation pattern 1001 and a pre-coding matrix index 1003. The pre-coding matrix index 'g' 1003 is input to beamformers 1013-1 to 1013-M. The beam permutation pattern 1001 is input to a beam permutation unit 1010. Input symbol streams are also input to the beam permutation unit 1010. Then the beam permutation unit 1010 determines to which beamformer it will output the input symbol streams, based on the beam permutation pattern, and then outputs the input symbol streams to the corresponding beamformer(s).

The beamformers 1013-1 to 1013-M, receiving the input beam streams and the pre-coding matrix index 'g' 1003, use column vectors of a $g^{th}$ space pre-coding matrix as beamforming weights. The first beamformer 1013-1 uses a first column vector of the $g^{th}$ space pre-coding matrix as a beamforming weight, and the $M^{th}$ beamformer 1013-M uses an $M^{th}$ column vector of the $g^{th}$ space pre-coding matrix as a beamforming weight.

The beam permutation pattern 1001 indicates a method of mapping modulation symbol streams delivered to the opportunistic space pre-coder 910 to associated beamformers. Because the beam permutation unit 1010 determines to which beamformer it will input a particular modulation symbol stream based on the beam permutation pattern 1001, even though the same pre-coding matrix index is determined, the beam allocation method may change. The control function of inputting a particular modulation symbol stream to a particular beamformer is performed by the beam permutation unit 1010.

Figure 11:
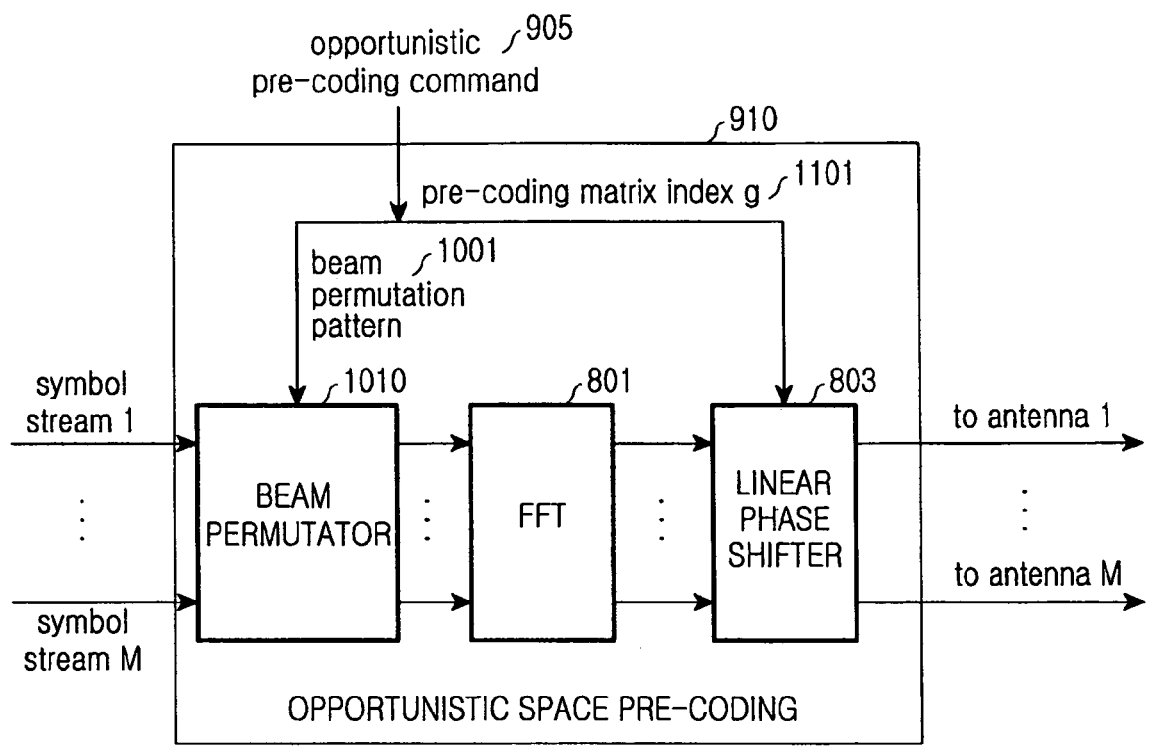
FIG. 11 is a block diagram illustrating an exemplary structure of the opportunistic space pre-coder of FIG. 9 implemented with an FFT unit according to another exemplary embodiment of the present invention.

FIG. 11 is a block diagram illustrating an exemplary structure of the opportunistic space pre-coder of FIG. 9 implemented with an FFT unit according to another exemplary embodiment of the present invention. With reference to FIG. 11, a description will now be made of a structure and operation of the opportunistic space pre-coder implemented with an FFT unit according to another exemplary embodiment of the present invention.

A Fourier transformer 801 and a linear phase shifter 803 in FIG. 11 are substantially the same as those shown in FIG. 8. In addition, an operation of controlling the linear phase shifter 803 using a pre-coding matrix index 1101 is also substantially the same as the corresponding operation of the space pre-coder of FIG. 8 implemented with an FFT unit. However, the novel opportunistic space pre-coder further includes a beam permutation unit 1010. The beam permutation unit 1010 is different in that it receives a beam permutation pattern 1001 and performs a beam permutation process before an FFT or IFFT process. The beam permutation process has been described in FIGS. 9 and 10.

Figure 12:
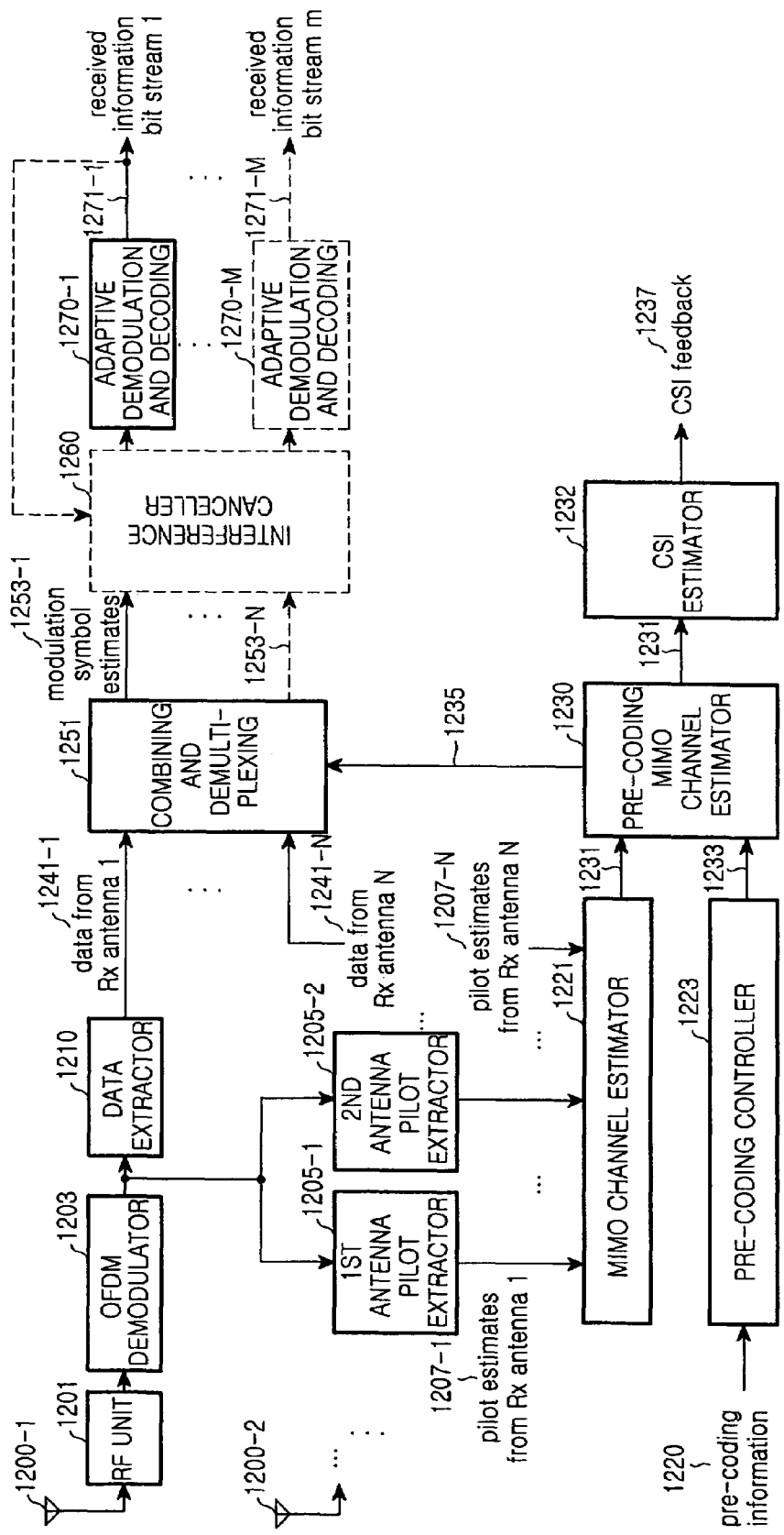
FIG. 12 is a block diagram illustrating an exemplary structure of a receiver corresponding to the space pre-coding transmitter of FIG. 6 according to an exemplary embodiment of the present invention.

FIG. 12 is a block diagram illustrating an exemplary structure of a receiver corresponding to the space pre-coding transmitter of FIG. 6 according to an exemplary embodiment of the present invention. With reference to FIG. 12, a description will now be made of a structure and operation of a receiver corresponding to the space pre-coding transmitter according to an exemplary embodiment of the present invention.

The receiver receives signals with N multiple reception antennas 1200-1 to 1200-2. In this specification, to avoid the duplicate description, the reception process will be described with reference to a first reception antenna 1200-1. The received signal is converted into a baseband signal by an RF unit 1201. An OFDM demodulator 1203 restores the baseband signal transmitted with each sub-carrier. Transmission antenna pilot extractors 1205-1 to 1205-2 for extracting the orthogonal pilot signals transmitted from associated transmission antennas extract pilot signals for the individual transmission antennas. A pilot signal 1207-1 extracted by the first transmission antenna pilot extractor 1205-1 is the pilot signal transmitted from a first transmission antenna, and includes a channel response that when a signal transmitted from the first transmission antenna is received at a first reception antenna, the signal experiences. A pilot signal 1207-2 extracted by the second transmission antenna pilot extractor 1205-2 is the pilot signal transmitted from a second transmission antenna, and includes a channel response that when a signal transmitted from the second transmission antenna is received at a second reception antenna, the signal experiences. If a pilot signal 1207-N received at up to an $N^{th}$ reception antenna (not shown) is extracted, all of the extracted pilot symbols are input to a MIMO channel estimator 1221. The MIMO channel estimator 1221 estimates a pure MIMO channel matrix to which the space pre-coding is not applied, and delivers the MIMO channel matrix to a pre-coding MIMO channel estimator 1230.

The pre-coding information 1220 applied to the data transmitted to the corresponding receiver is input to a pre-coding controller 1223. The pre-coding controller 1223 generates a space pre-coding matrix 1233 applied to reception data using the pre-coding information 1220, and delivers the generated space pre-coding matrix 1233 to the pre-coding MIMO channel estimator 1230. The pre-coding MIMO channel estimator 1230 estimates the pre-coded MIMO channel that the reception data experiences presently, also estimates all pre-coded MINMO channels that the reception data may experience at the following scheduling time, and then outputs the estimated values 1231 to a CSI estimator 1232. The CSI estimator 1232 generates a CSI feedback value 1237 based on the estimated values from the pre-coding MIMO channel estimator 1230, and transmits the CSI feedback value 1237 to a transmitter. In addition, a previously estimated value 1235 from the pre-coding MIMO channel estimator 1230 is delivered to a combining and demultiplexing unit 1251 so that it can be used for data demodulation.

A data extractor 1210 extracts modulation symbols transmitted to the receiver from the signal carried on each carrier by the OFDM modulator 1203. The data extractor 1210 extracts only the signal that the receiver should receive, and outputs the extracted signal to the combining and demultiplexing unit 1251. This operation is performed in every data extractor corresponding to each antenna. Therefore, after receiving all of the data modulation symbols 1241-1 to 1241-N extracted from the reception antennas, the combining and demultiplexing unit 1251 combines the received symbols, and restores modulation symbols 1253-1 to 1253-N of multiple data streams transmitted from the transmitter to the receiver. Therefore, the combining and demultiplexing unit 1251 demultiplexes the data stream modulation symbols 1253-1 to 1253-N, and outputs the result to an interference canceller 1260. The interference canceller 1260 is shown by a dotted block. As described above, the part shown by the dotted line is optional according to system. Therefore, some receivers may not use the interference canceller 1260.

However, it is assumed herein that the interference canceller 1260 is provided. The interference canceller 1260 cancels interferences from the input signals using the information extracted from the previous values, and outputs the interference-cancelled signals to adaptive demodulation and decoding units 1270-1 to 1270-M.

Figure 13:
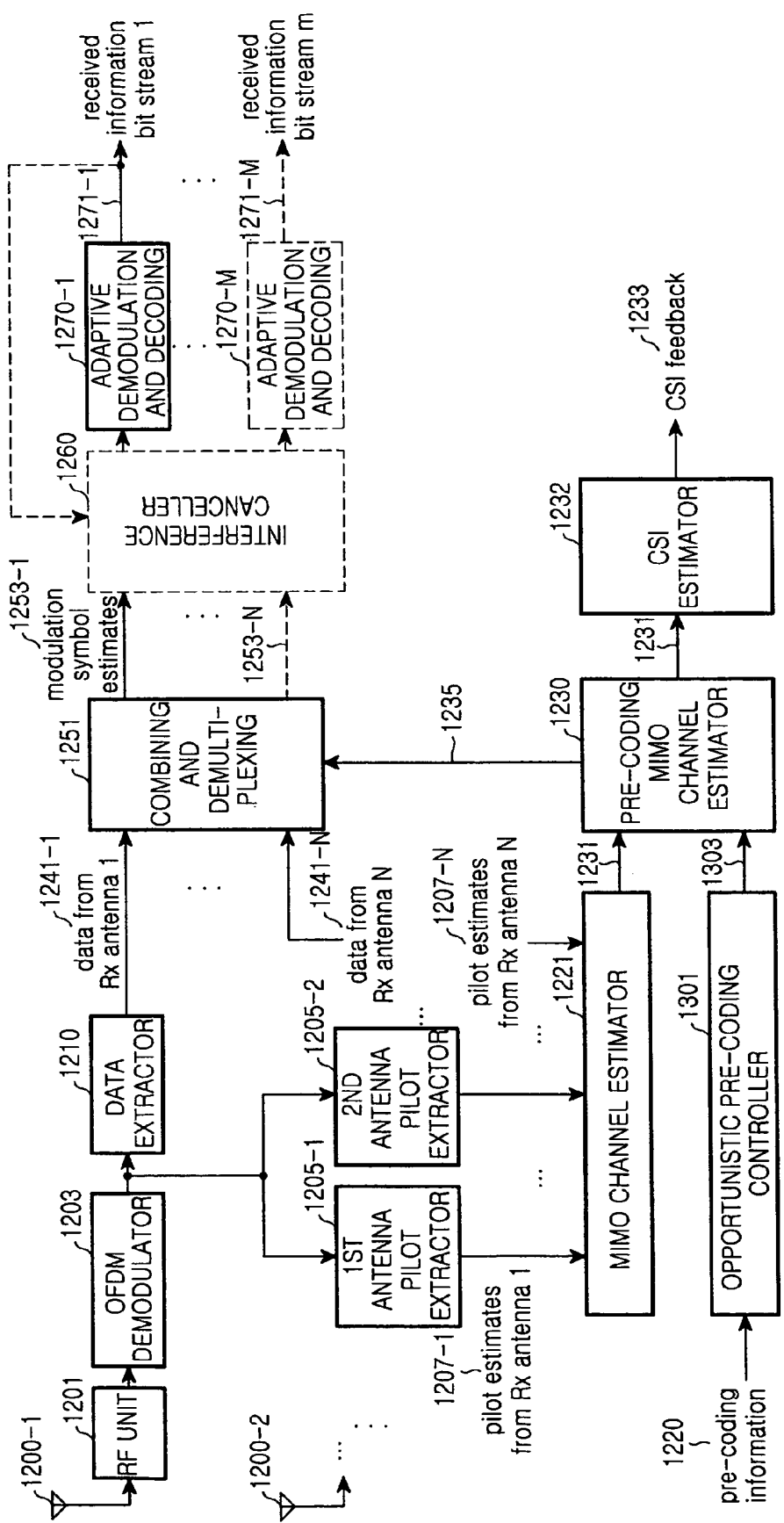
FIG. 13 is a block diagram illustrating an exemplary structure of a receiver corresponding to the opportunistic space pre-coding transmitter of FIG. 9 according to an exemplary embodiment of the present invention.

FIG. 13 is a block diagram illustrating an exemplary structure of a receiver corresponding to the opportunistic space pre-coding transmitter of FIG. 9 according to an exemplary embodiment of the present invention. With reference to FIG. 13, a description will now be made of a structure and operation of a receiver corresponding to the opportunistic space pre-coding transmitter according to an exemplary embodiment of the present invention.

A notable difference between the opportunistic space pre-coding receiver of FIG. 13 and the space pre-coding receiver of FIG. 12 is that an opportunistic pre-coding controller 1301 spontaneously generates a space pre-coding matrix 1303 without separately receiving the pre-coding information, and directly delivers the space pre-coding matrix 1303 to a pre-coding MIMO channel estimator 1230. The other process is substantially the same as the corresponding process described in FIG. 12.

Figure 14:
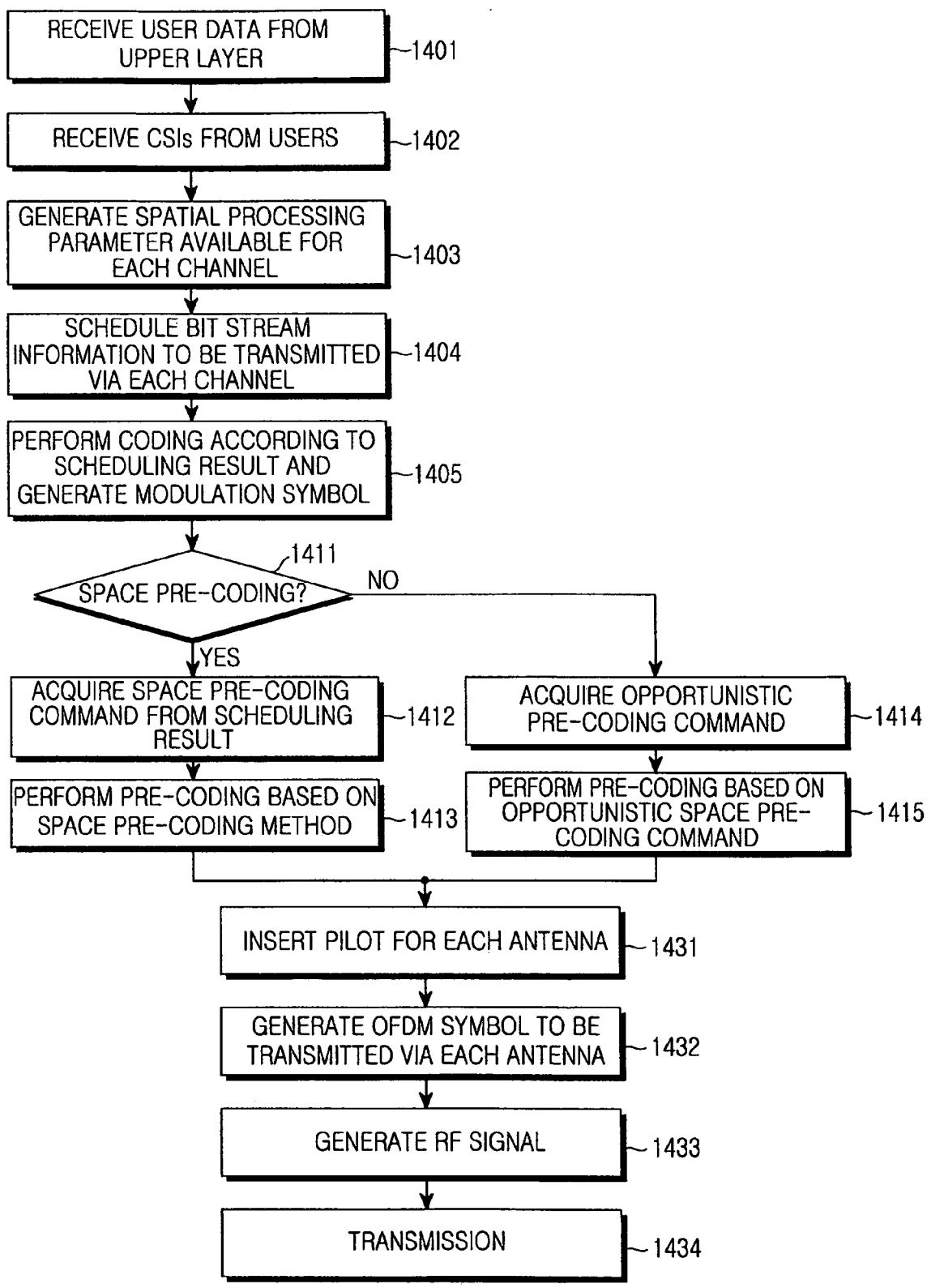
FIG. 14 is a flowchart illustrating a process of transmitting data streams in a transmitter according to an exemplary embodiment of the present invention.

FIG. 14 is a flowchart illustrating a process of transmitting data streams in a transmitter according to an exemplary embodiment of the present invention. With reference to FIG. 14, a description will now be made of a process of transmitting data streams in a transmitter according to an exemplary embodiment of the present invention.

In step 1401, a transmitter receives a data stream of each user from an upper layer. In step 1402, the transmitter gathers CSI information fed back from a receiver. In step 1403, the transmitter prepares all possible space pre-coding methods. If the transmitter uses space pre-coding, the space pre-coding method is not determined in this step. In step 1404, the transmitter performs scheduling on all the possible space pre-coding methods.

However, if the transmitter uses opportunistic pre-coding, the space pre-coding method is determined in step 1403. Next, in step 1404, the transmitter determines which user data stream is to be scheduled by its scheduler. Herein, the scheduling is performed based on the space pre-coding method determined in step 1403. The scheduled user's data stream is converted into a modulation signal through a coding and modulation process in step 1405. Thereafter, the transmitter determines in step 1411 whether a pre-coding method to be used is a space pre-coding method. The pre-coding method is changed according to whether the pre-coding method to be used is a space pre-coding method or an opportunistic pre-coding method.

For the pre-coding method selection, either the system or the user can select one of the space pre-coding method or the opportunistic pre-coding method. That is, all users in the system can use one pre-coding method. Otherwise, some users can use the space pre-coding method, and the other users can use the opportunistic pre-coding method.

If the transmitter uses the space pre-coding method, it receives a pre-coding command from the scheduler in step 1412, and performs space pre-coding in step 1413. On the contrary, if the transmitter users the opportunistic pre-coding method, it generates a pre-coding command according to a predefined pattern in step 1414, and performs space pre-coding according to the command in step 1415.

After step 1413 or 1415, the transmitter attaches a pilot signal to the pre-coded signal in step 1431, and converts the pilot-attached signal into an OFDM symbol by OFDM modulation in step 1432. The transmitter converts the baseband OFDM symbol into an RF signal by RF processing in step 1433, and then transmits the RF signal via multiple transmission antennas in step 1434.

Figure 15:
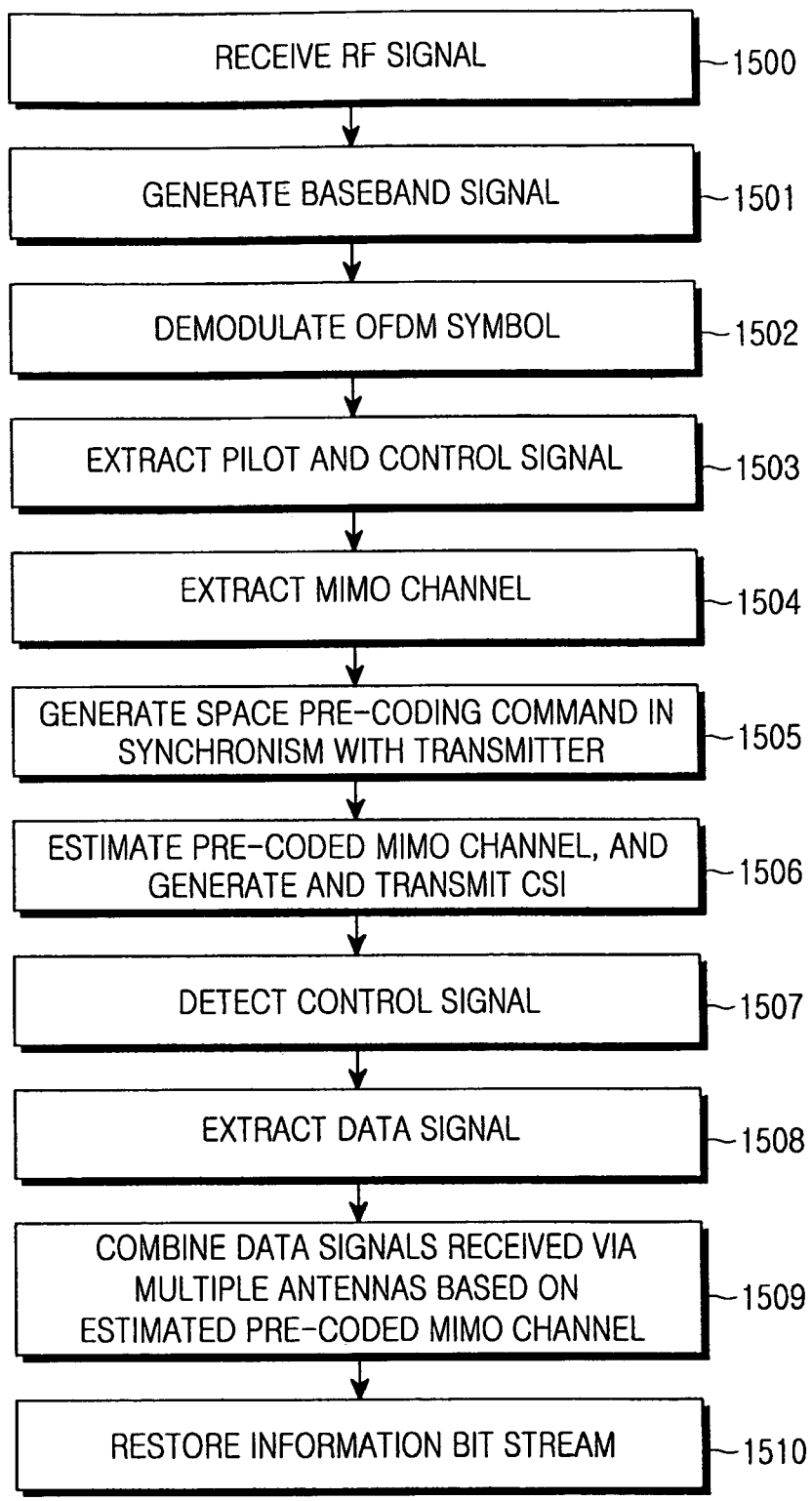
FIG. 15 is a flowchart illustrating a process of receiving data streams in a receiver according to an exemplary embodiment of the present invention.

FIG. 15 is a flowchart illustrating a process of receiving data streams in a receiver according to an exemplary embodiment of the present invention. With reference to FIG. 15, a description will now be made of a process of receiving data streams in a receiver according to an exemplary embodiment of the present invention.

A receiver receives RF signals from multiple reception antennas in step 1500, and converts the RF signals into baseband signals in step 1501. Because the converted baseband signals are OFDM symbols, the receiver restores in step 1502 the modulation signals carried by each sub-carrier using an OFDM demodulator. Thereafter, the receiver extracts a pilot and a control signal in step 1503, and estimates a MIMO channel using the extracted pilot in step 1504.

Next, the receiver performs a process of estimating a pre-coded MIMO channel. The receiver generates the space pre-coding command used in a transmitter in step 1505, and estimates a pre-coded MIMO channel using the generated value in step 1506. Once the pre-coded MIMO channel is estimated, the receiver uses the estimated pre-coded MIMO channel in generating a CSI feedback value. With the use of the estimated pre-coded MIMO channel, the receiver can restore the modulation signal to which the space pre-coding method is applied. Therefore, the receiver restores a control signal necessary for data restoration in step 1507, and extracts data based on the control signal in step 1508. Next, in step 1509, the receiver combines the extracted data based on the estimated pre-coded MIMO channel. Thereafter, in step 1510, the receiver finally demodulates and decodes the combined signal, thereby restoring the transmitted data stream.

As described above, the space pre-coder and the opportunistic pre-coder proposed in the present invention can implement various MIMO technologies such as beamforming, spatial multiplexing, and SDMA according to the decision of the scheduler.

Because the opportunistic space pre-coder has no need to receive CSI feedback associated with space pre-coding from the receiver to determine the space pre-coding method, it can obtain the improved system capacity with the same amount of feedback as that of the PARC. In addition, the opportunistic space pre-coder can have an effect of intentionally changing a channel according to frequency and time when it experiences a bad channel status in the channel environment where a change in the channel according to frequency and time is very inconsiderable. This effect can be obtained by applying a different space pre-coding method every sub-band and time slot which is a unit of AMC and channel sensitive scheduling. Generally, in the system operating taking fairness into consideration, when a user in the channel environment where a change in the channel according to frequency and time is very insignificant experiences the poor channel status, the channel status may not become good within a short time and then the transmitter cannot but allocate resources. In this case, the system capacity decreases. This problem can be solved with the use of the opportunistic space pre-coding. In this way, the present invention contributes to an increase in system capacity and a decrease in overhead load.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data in a base station of a wireless communication system that transmits data depending on channel status information fed back from terminals and uses a plurality of antennas in a Multiple-Input Multiple-Output (MIMO) scheme, the method comprising the steps of:

determining a terminal to which the base station will transmit data, determining antennas via which the base station will transmit data among the plurality of antennas, and determining a space pre-coding method based on the channel status information;

multiplexing transmission data into a plurality of data streams according to the number of the determined antennas, and performing coding and modulation on each of the data streams;

outputting a matrix select signal for selecting one of a plurality of space pre-coding matrixes according to the space pre-coding method, and spatial-coding each of the coded streams with the matrix selected based on the matrix select signal; and performing Orthogonal Frequency Division Multiplexing (OFDM) modulation on each of the spatial-coded streams, and transmitting each of the OFDM-modulated streams via an associated antenna.

2. The method of claim 1, further comprising the step of determining a coding and modulation scheme using the channel status information;

wherein each of the streams is adaptively coded and modulated according to the determined coding and modulation scheme.

3. The method of claim 1, wherein the space pre-coding comprises the steps of:

beamforming each of the modulated streams using the selected matrix among predetermined matrixes; and adding the beamformed streams for each individual path corresponding to an antenna via which the streams will be transmitted.

4. The method of claim 1, wherein the space pre-coding comprises:

receiving the modulated streams and performing Inverse Fast Fourier Transform (IFFT) on the received streams; and phase-shifting each of the IFFT-processed streams using the selected matrix among predetermined matrixes.

5. The method of claim 1, further comprising the step of inserting a pilot signal to be transmitted via a corresponding antenna in each of the space pre-coded streams.

6. An apparatus for transmitting data in a base station of a wireless communication system that transmits data depending on channel status information fed back from terminals and uses a plurality of antennas in a Multiple-Input Multiple-Output (MIMO) scheme, the apparatus comprising:

a scheduler for determining a terminal to which the base station will transmit data, determining antennas via which the base station will transmit data among the plurality of antennas, and determining a space pre-coding method based on the channel status information;

a multiplexer for multiplexing transmission data into a plurality of data streams according to the number of the determined antennas;

a modulation and coding unit for performing modulation and coding on each of the data streams;

a pre-coding controller for outputting a matrix select signal for selecting one of a plurality of space pre-coding matrixes according to the space pre-coding method;

a space pre-coder for spatial-coding each of the coded streams with the matrix selected based on the matrix select signal;

an Orthogonal Frequency Division Multiplexing (OFDM) modulator for performing OFDM modulation on each of the spatial-coded streams; and a radio frequency (RF) unit for transmitting each of the OFDM-modulated streams via an associated antenna.

7. The apparatus of claim 6, further comprising an Adaptive Modulation and Coding (AMC) controller for determining a coding and modulation scheme using the channel status information;

wherein the channel coding and modulation unit adaptively codes and modulates each of transmission streams under the control of the AMC controller.

8. The apparatus of claim 6, wherein the space pre-coder comprises:

a beamformer for selecting one of predetermined matrixes based on the matrix select signal, receiving the modulated streams, beamforming each of the modulated streams using the selected matrix; and an adder for adding the beamformed streams for each individual path corresponding to an antenna via which the streams will be transmitted.

9. The apparatus of claim 6, wherein the space pre-coder comprises:

an Inverse Fast Fourier Transform (IFFT) unit for receiving the modulated streams and performing IFFT on the received streams; and a phase shifter for selecting one of predetermined matrixes based on the matrix select signal, and phase-shifting each of the IFFT-processed streams using the selected matrix.

10. The apparatus of claim 6, further comprising a pilot inserter for inserting a pilot signal to be transmitted via a corresponding antenna in each of the space pre-coded streams.

11. An apparatus for transmitting data in a base station of a wireless communication system that transmits data depending on channel status information fed back from terminals and uses a plurality of antennas in a Multiple-Input Multiple-Output (MIMO) scheme, the apparatus comprising:

a scheduler for determining a terminal to which the base station will transmit data, and determining antennas via which the base station will transmit data among the plurality of antennas based on the channel status information;

a multiplexer for multiplexing transmission data into a plurality of data streams according to the number of the determined antennas;

a modulation and coding unit for performing modulation and coding on each of the data streams;

a pre-coding controller for outputting a space pre-coding command to be applied to data streams to be transmitted to a selected terminal;

a space pre-coder for spatial-coding each of the coded streams selected based on the space pre-coding command;

an Orthogonal Frequency Division Multiplexing (OFDM) modulator for performing OFDM modulation on each of the spatial-coded streams; and a radio frequency (RF) unit for transmitting each of the OFDM-modulated streams via an associated antenna.

12. The apparatus of claim 11, further comprising an Adaptive Modulation and Coding (AMC) controller for determining a modulation and coding scheme using the channel status information;

wherein the channel coding and modulation unit adaptively codes and modulates each of transmission streams under the control of the AMC controller.

13. The apparatus of claim 11, wherein the space pre-coder comprises:

a beam permutation unit for permuting input streams based on the space pre-coding command;

a beamformer for selecting one of a plurality of beamforming patterns based on the space pre-coding command, and beamforming the permuted streams based on the selected beamforming pattern; and an adder for adding the beamformed streams for each individual path corresponding to an antenna via which the streams will be transmitted.

14. The apparatus of claim 11, wherein the space pre-coder comprises:
a beamformer for selecting one of a plurality of beamforming patterns based on the space pre-coding command, and beamforming the permuted streams based on the selected beamforming pattern;
an Inverse Fast Fourier Transform (IFFT) unit for receiving the beamformed streams, and performing IFFT on the received streams; and
a phase shifter for selecting one of predetermined matrixes based on the space pre-coding command, and phase-shifting each of the IFFT-processed streams using the selected matrix.

15. The apparatus of claim 11, further comprising a pilot inserter for inserting a pilot signal to be transmitted via a corresponding antenna in each of the space pre-coded streams.

16. A method for transmitting data in a base station of a wireless communication system that transmits data depending on channel status information fed back from terminals and uses a plurality of antennas in a Multiple-Input Multiple-Output (MIMO) scheme, the method comprising the steps of:
determining a terminal to which the base station will transmit data, and determining antennas via which the base station will transmit data among the plurality of antennas based on the channel status information;
multiplexing transmission data into a plurality of data streams according to the number of the determined antennas;
performing modulation and coding on each of the data streams;
determining a space pre-coding method to be applied to data streams to be transmitted to a selected terminal, and spatial-coding each of the data streams using the determined space pre-coding method;
performing Orthogonal Frequency Division Multiplexing (OFDM) modulation on each of the spatial-coded streams; and
transmitting each of the OFDM-modulated streams via an associated antenna.

17. The method of claim 16, further comprising the step of adaptively determining a coding and modulation scheme using the channel status information, and coding and modulating each of transmission streams with the determined coding and modulation scheme.

18. The method of claim 16, wherein the space pre-coding comprises the steps of:
permuting input streams based on the space pre-coding method;
selecting one of a plurality of beamforming patterns based on the space pre-coding command, and beamforming the permuted streams based on the selected beamforming pattern; and
adding the beamformed streams for each individual path corresponding to an antenna via which the streams will be transmitted.

19. The method of claim 16, wherein the space pre-coding comprises:

selecting one of a plurality of beamforming patterns based on the space pre-coding method, and beamforming the permuted streams based on the selected beamforming pattern;
receiving the beamformed streams, and performing Inverse Fast Fourier Transform (IFFT) on the received streams; and
selecting one of predetermined matrixes based on the space pre-coding command, and phase-shifting each of the IFFT-processed streams using the selected matrix.

20. The method of claim 16, further comprising the step of inserting a pilot signal to be transmitted via a corresponding antenna in each of the space pre-coded streams.

21. An apparatus for receiving data by a terminal in a wireless communication system that transmits data depending on channel status information fed back from terminals and uses a plurality of antennas in a Multiple-Input Multiple-Output (MIMO) scheme, the apparatus comprising:
a transmission antenna pilot extractor for extracting a pilot signal transmitted via each transmission antenna from a signal received from each antenna;
a MIMO channel estimator for estimating a MIMO channel using information received from the transmission antenna extractor;
a pre-coding MIMO channel estimator for estimating a pre-coded MIMO channel using the estimated MIMO channel and pre-coding information;
a data extractor for extracting data from the received signal;
a combining and demultiplexing unit for combining and demultiplexing the data extracted by the data extractor using the signal output from the pre-coding MIMO channel estimator; and
a demodulation and decoding unit for demodulating and decoding the demultiplexed signal.

22. The apparatus of claim 21, further comprising an interference canceller for canceling an interference signal from the demultiplexed signal.

23. A method for receiving data by a terminal in a wireless communication system that transmits data depending on channel status information fed back from terminals and uses a plurality of antennas in a Multiple-Input Multiple-Output (MIMO) scheme, the method comprising the steps of:
extracting a pilot signal transmitted via each transmission antenna from a signal received from each antenna at a transmission antenna pilot extractor;
estimating, at a MIMO channel estimator, a MIMO channel using the extracted pilot signal;
estimating, at a pre-coding MIMO channel estimator, a pre-coded MIMO channel using the estimated MIMO channel and pre-coding information;
extracting, at a data extractor, data from the received signal;
combining and demultiplexing the extracted data using the estimated pre-coded MIMO channel at a combining and demultiplexing unit; and
demodulating and decoding the demultiplexed signal at a demodulating and decoding unit.

24. The method of claim 23, further comprising the step of canceling an interference signal from the demultiplexed signal with an interference canceller.

* * * * *